(12) United States Patent
Merritt et al.

(10) Patent No.: US 10,692,484 B1
(45) Date of Patent: Jun. 23, 2020

(54) TEXT-TO-SPEECH (TTS) PROCESSING

(71) Applicant: Amazon Technologies, Inc., Seattle, WA (US)

(72) Inventors: Thomas Edward Merritt, Cambridge (GB); Adam Franciszek Nadolski, Gdansk (PL); Nishant Prateek, Cambridge (GB); Bartosz Putrycz, Cambridge (GB); Roberto Barra Chicote, Cambridge (GB); Vatsal Aggarwal, Cambridge (GB); Andrew Paul Breen, Norwich (GB)

(73) Assignee: Amazon Technologies, Inc., Seattle, WA (US)

(*) Notice: Subject to any disclaimer, the term of this patent is extended or adjusted under 35 U.S.C. 154(b) by 192 days.

(21) Appl. No.: 16/007,757

(22) Filed: Jun. 13, 2018

(51) Int. Cl.
*G10L 13/04* (2013.01)
*G10L 13/08* (2013.01)
*G10L 25/24* (2013.01)
*G10L 25/60* (2013.01)
*G10L 13/047* (2013.01)

(52) U.S. Cl.
CPC .......... *G10L 13/08* (2013.01); *G10L 13/047* (2013.01); *G10L 25/24* (2013.01); *G10L 25/60* (2013.01)

(58) Field of Classification Search
CPC ..... G10L 15/16; G10L 13/043; G10L 15/063; G10L 15/1815; G10L 13/00; G10L 15/02; G10L 25/48; G10L 2015/025; G10L 21/0202; G10L 13/08; G10L 15/183; G10L 25/30; G10L 13/047; G10L 25/63; G10L 13/027; G10L 13/033; G10L 13/04; G10L 13/06; G10L 17/22; G10L 2015/227; G10L 25/24; G10L 13/10; G10L 15/18; G10L 17/18; G10L 21/028; G10L 25/03
See application file for complete search history.

(56) References Cited

U.S. PATENT DOCUMENTS

2018/0096677 A1* 4/2018 Pollet ...................... G10L 13/04
2019/0311708 A1* 10/2019 Bengio .................... G10L 25/18

OTHER PUBLICATIONS

Hunt, et al., "Unit Selection in a Concatenative Speech Synthesis System Using a Large Speech Database," in ICASSP, 1996, pp. 373-376.
Taylor et al., "The Architecture of the Festival Speech Synthesis System," in the Third ESCA/COCOSDA workshop on Speech Synthesis, 1998.
Taylor et al., "The Target Cost Formulation in Unit Selection Speech Synthesis," in Interspeech, 2006.
Zen et al., "Statistical Parametric Speech Synthesis," Speech Communication, vol. 51, No. 11, pp. 1039-1064, 2009.
S. King, "An Introduction to Statistical Parametric Speech Synthesis," Sadhana, vol. 36, pp. 837-852, 2011.
Zen et al., "Statistical Parametric Speech Synthesis Using Deep Neural Networks," in ICASSP, 2013.

(Continued)

*Primary Examiner* — Huyen X Vo
(74) *Attorney, Agent, or Firm* — Pierce Atwood LLP

(57) ABSTRACT

A speech model is trained using multi-task learning. A first task may correspond to how well predicted audio matches training audio; a second task may correspond to a metric of perceived audio quality. The speech model may include, during training, layers related to the second task that are discarded at runtime.

20 Claims, 18 Drawing Sheets

(56) References Cited

OTHER PUBLICATIONS

H. Zen, "Acoustic Modeling in Statistical Parametric Speech Synthesis—from HMM to LSTM-RNN," Proc. MLSLP, 2015.
Ling et al., "The USTC System for Blizzard Challenge 2008," in Blizzard Challenge, 2008.
Qian et al., "A Unified Trajectory Tiling Approach to High Quality Speech Rendering," IEEE Transactions on Audio, Speech, and Language Processing, vol. 21, No. 2, pp. 280-290, 2013.
Merritt et al., "Deep Neural Network-Guided Unit Selection Synthesis," in ICASSP, 2016.
H. Kawahara, "Straight, Exploitation of the Other Aspect of Vocoder: Perceptually Isomorphic Decomposition of Speech Sounds," Acoustical Science and Technology, vol. 27, No. 6 pp. 349-353, 2006.
Moirse et al., "WORLD: A Vocoder-Based High-Quality Speech Synthesis System for Real-Time Applications," IEICE Transactions on Information and Systems, 2016.
Merritt et al., "Investigating Source and Filter Contributions, and Their Interactions, to Statistical Parametric Speech Synthesis," in Interspeech, 2014.
Merrit et al., "Attributing Modeling Errors in HMM Synthesis by Stepping Gradually from Natural to Modeled Speech," in ICASSP, 2015.
Yan, et al., "Rich-Context Unit Selection (RUS) Approach to High Quality TTS," in ICASSP, 2010.
Oord et al., "Wavenet: A Generative Model for Raw Audio," in arXiv preprint arXiv: 1609.03499. 2016.
Arik et al., "Deep Voice: Real-Time Neural Text-To-Speech," in arXiv: 1702.
Arik et al., "Deep Voice 2: Multi-Speaker Neural Text-To-Speech," in Advances in Neural Information Processing Systems, 2017, pp. 2966-2974.
Ping et al., "Deep Voice 3: 2000-Speaker Neural Text-To-Speech," in arXiv: 1710.07654, 2017.
Mehri et al., "SampleRNN: An Unconditional End-To-End Neural Audio Generation Model," in ICLR, 2017.
Sotelo et al., "Char2wav: End-To-End Speech Synthesis," in ICLR, 2017.
Oord et al., "Parallel Wavenet: Fast High-Fidelity Speech Synthesis," in arXiv: 1711.10433v1, 2017.
Klimkov et al., "Phrase Break Prediction for Long-Form Reading TTS: Exploiting Text Structure Information," in Interspeech, 2017.
"Method for the Subjective Assesment of Intermediate Quality Level of Coding Systems," International Telecommunication Union Radiocommunication Assembly, 2003, ITU Recommendations ITU-R BS. 1534-1.
Henter et al., "Measuring the Perceptual Effects of Modeling Assumptions in Speech Synthesis Using Stimuli Constructed From Repeated Natural Speech," in Interspeech, 2014.
Watts et al., "From HMMS to dnns: Where do the Improvements come from?" in ICASSP, 2016.
Wester et al., "Are we Using Enough Listeners? No! An Empiricaly-Supported Critique of Interspeech 2014 TTS Evaluations," in Interspeech, 2015.
The Examiner's attention is hereby drawn to the specification and file history co-pending U.S. Appl. No. 16/007,811, entitled "Text-To-Speech (TTS) Processing", filed Jun. 13, 2018, which may contain information relevant to the present application.
The Examiner's attention is hereby drawn to the specification and file history of co-pending U.S. Appl. No. 16/023,370, entitled "Text-To-Speech (TTS) Processing", filed Jun. 29, 2018, which may contain information relevant to the present application.

* cited by examiner

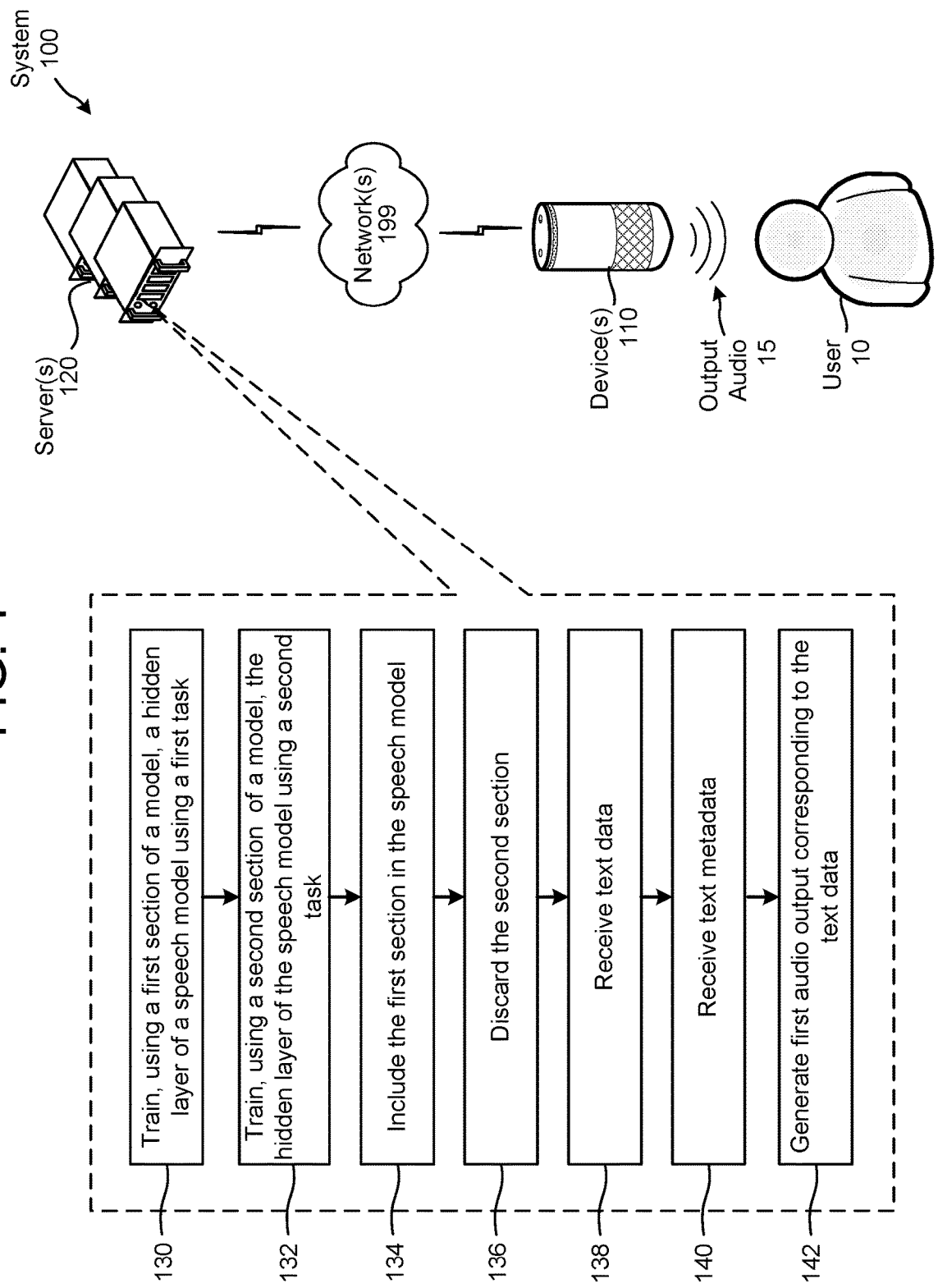

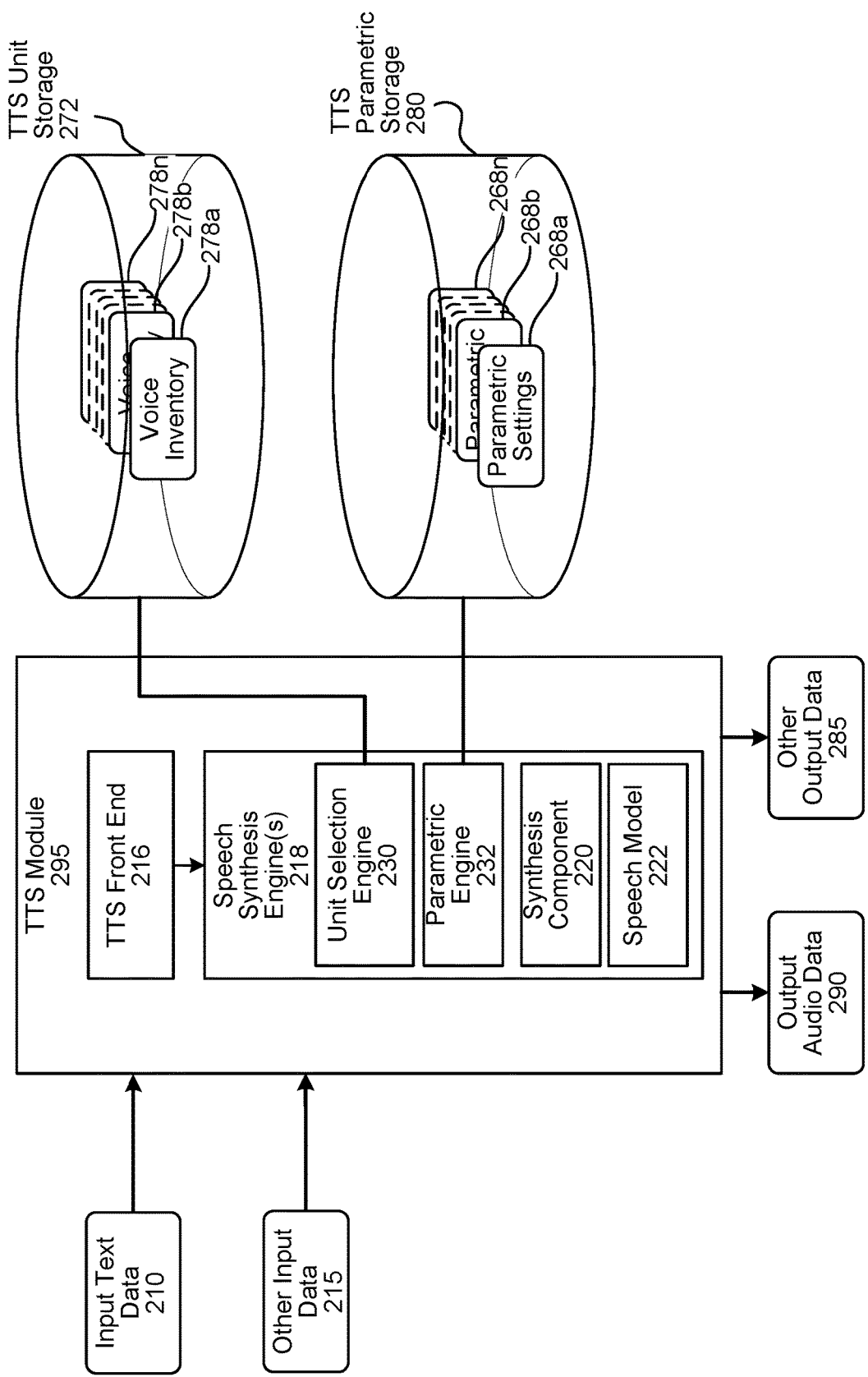

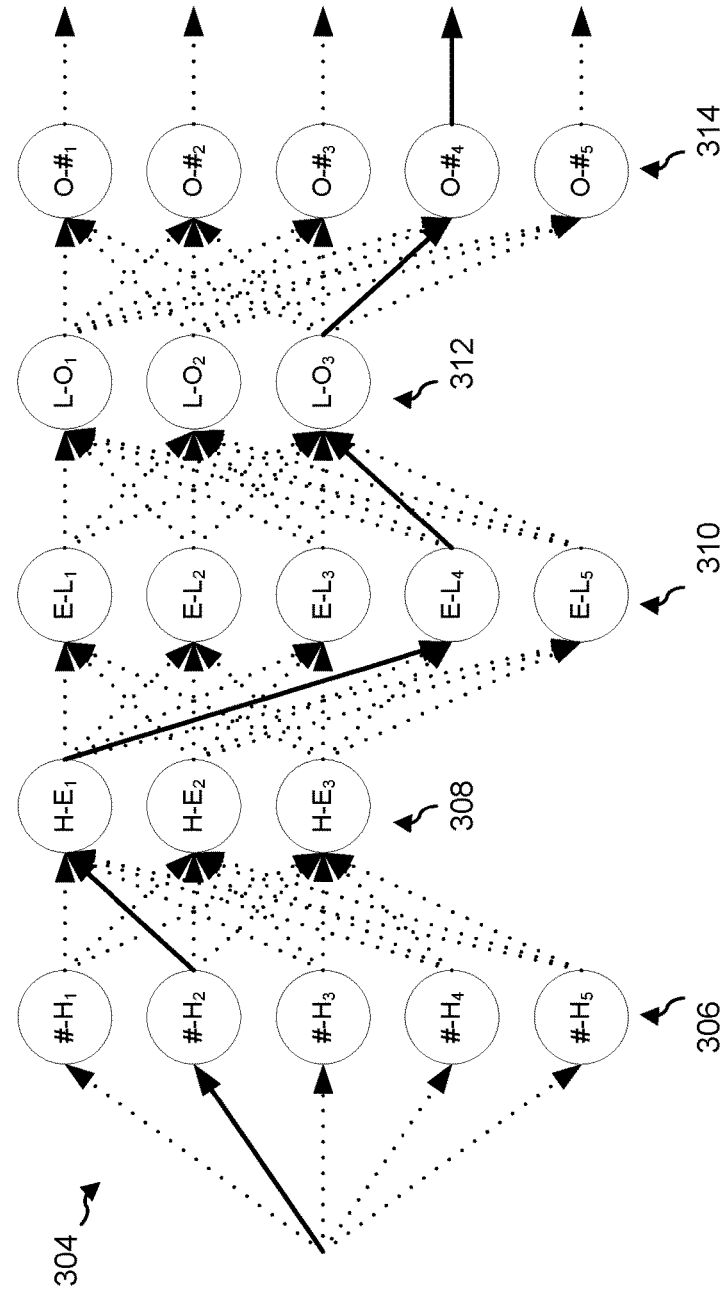
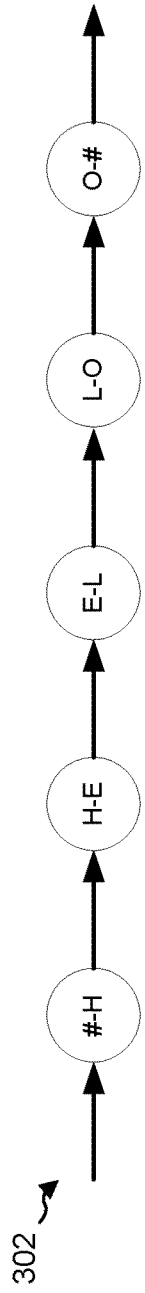
FIG. 3B

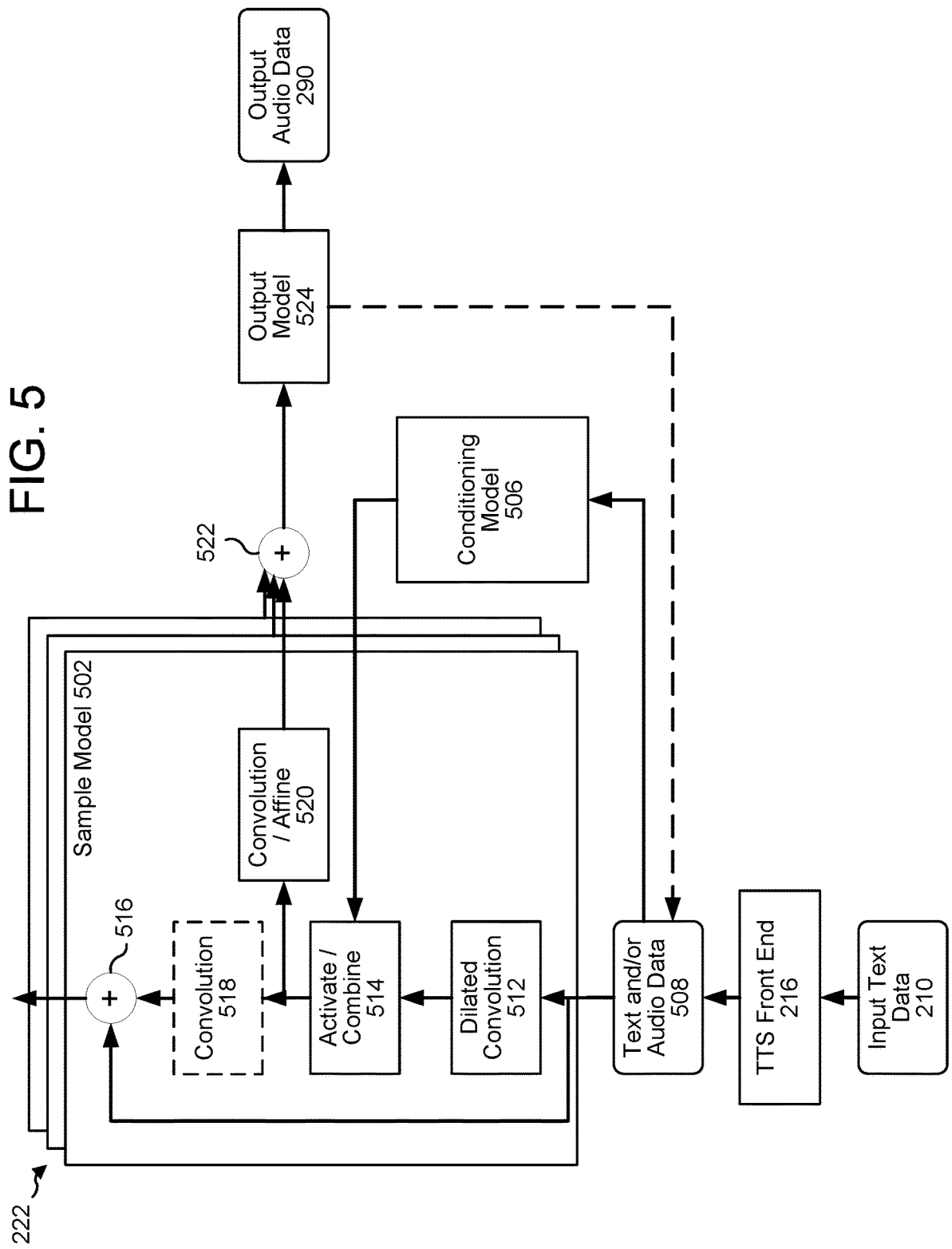

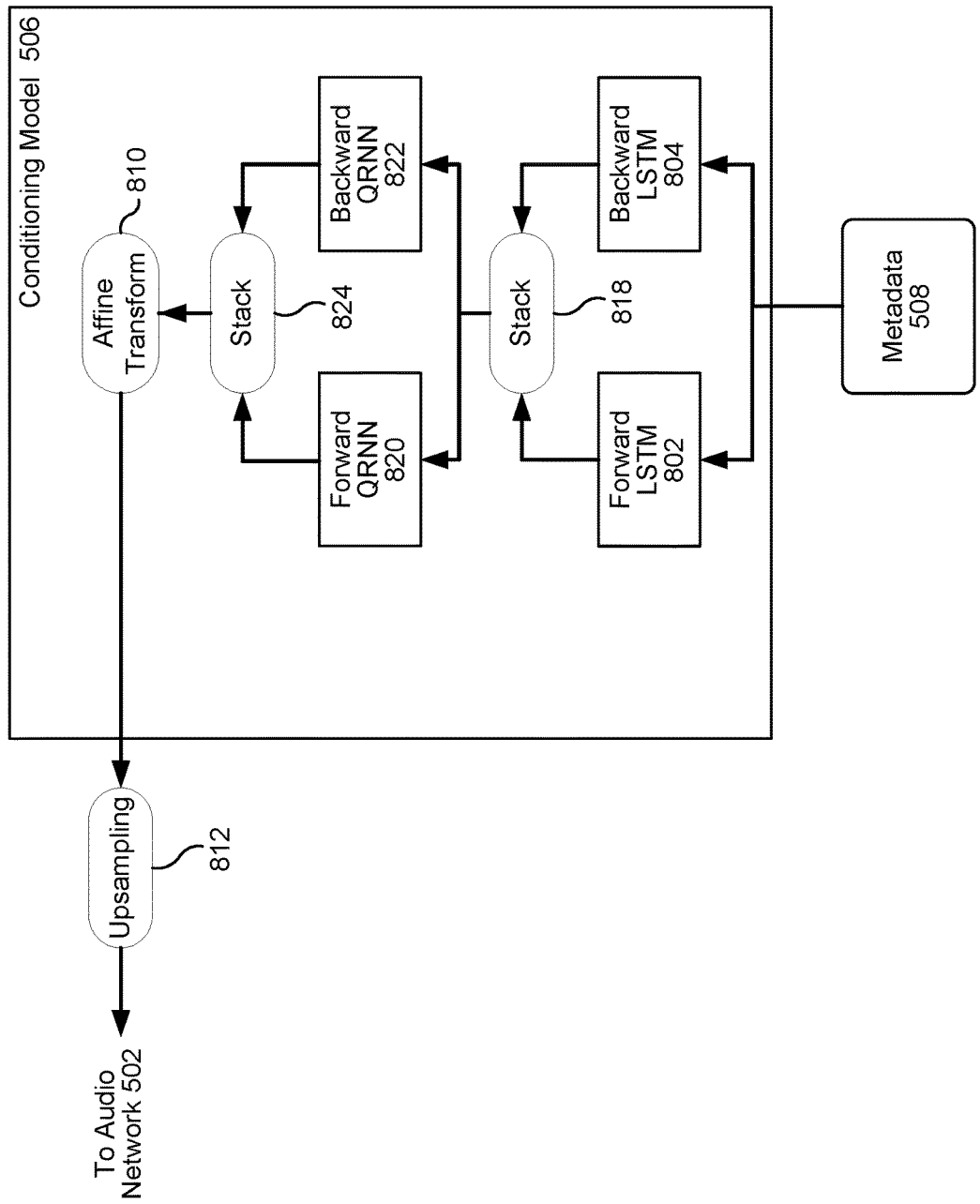

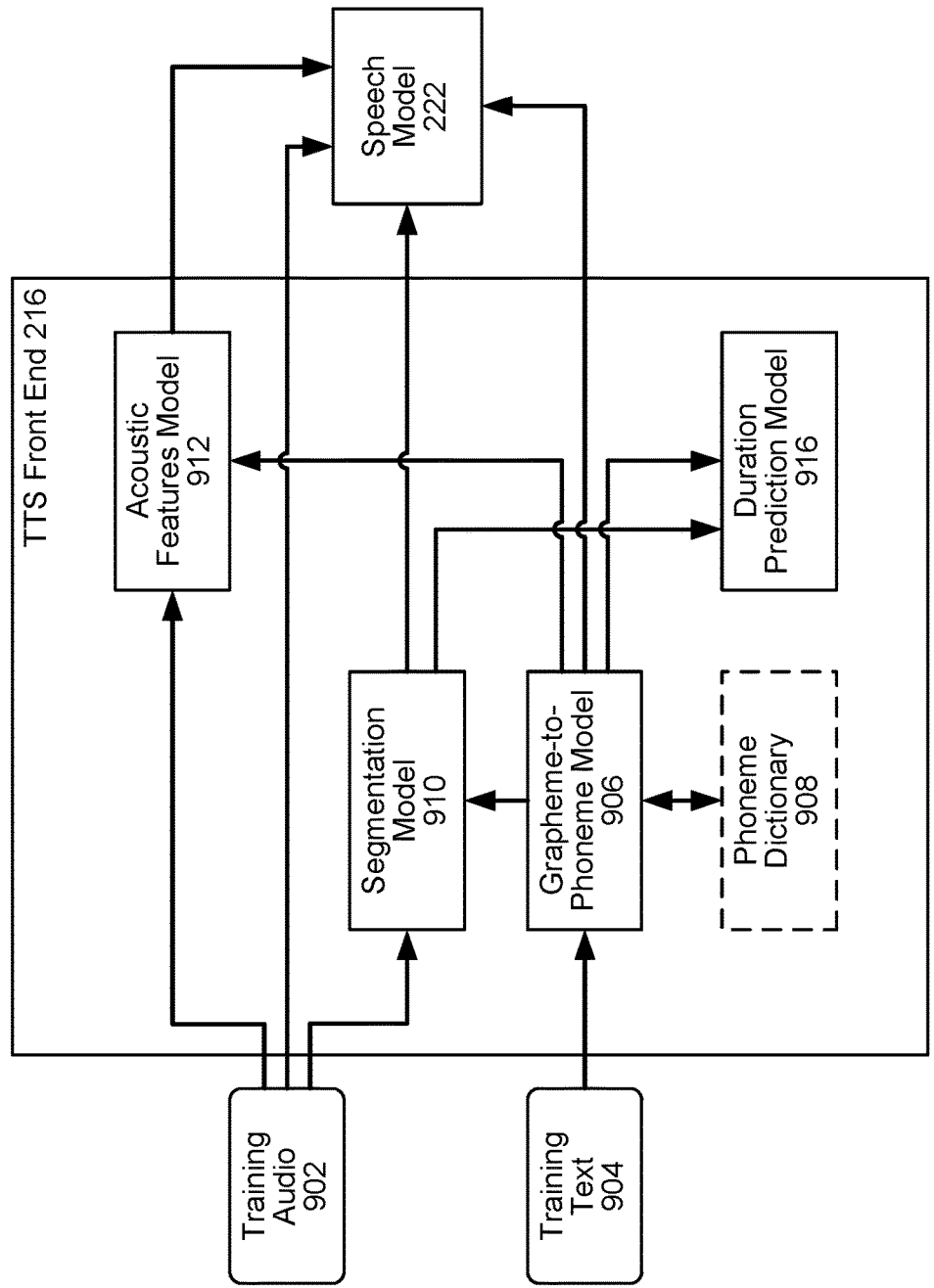

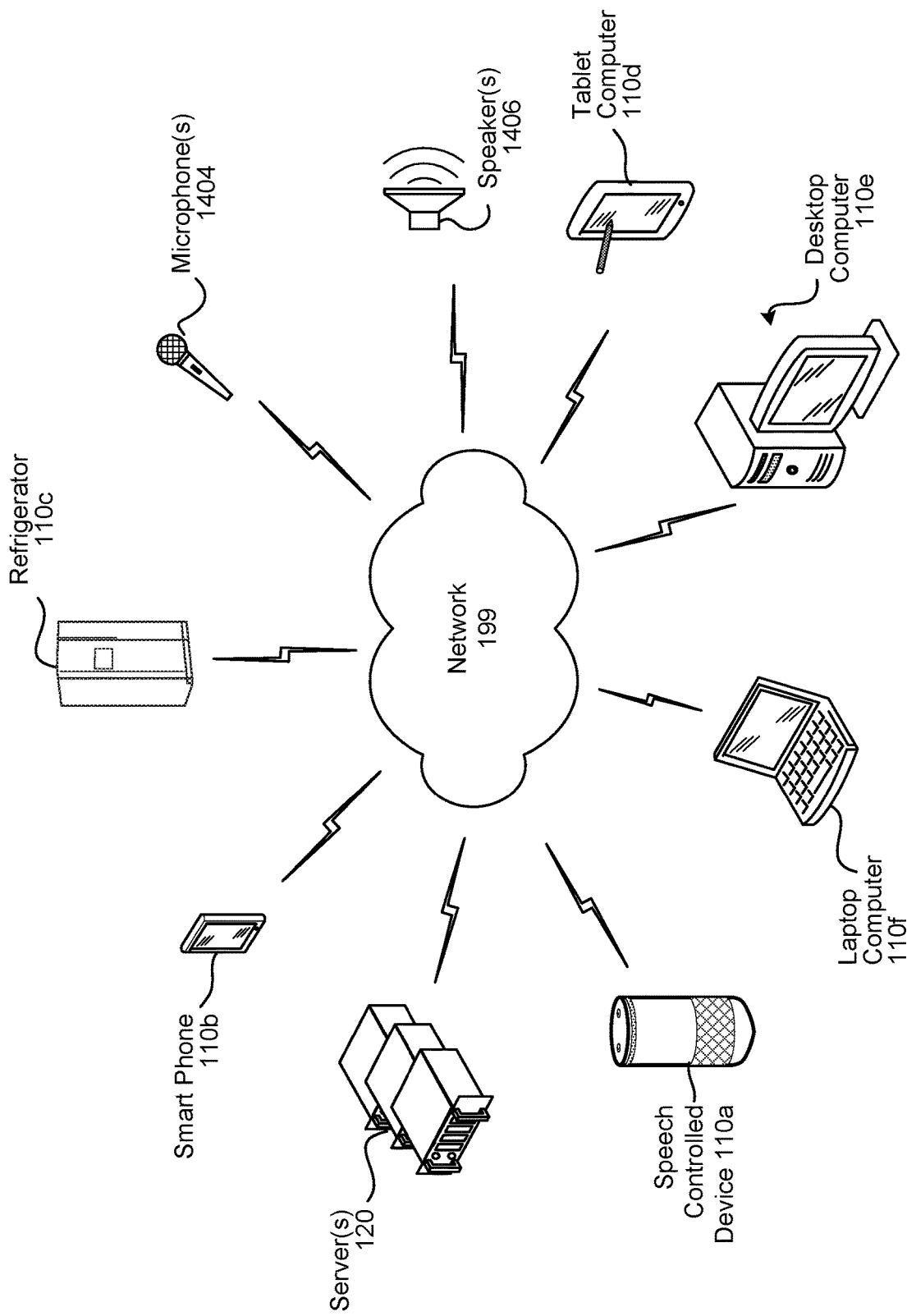

TEXT-TO-SPEECH (TTS) PROCESSING

BACKGROUND

Text-to-speech (TTS) systems convert written text to sound. This can be useful to assist users of digital text media by synthesizing speech representing text displayed on a computer screen. Speech recognition systems have also progressed to the point where humans can interact with and control computing devices by voice. TTS and speech recognition combined with natural language understanding processing techniques enable speech-based user control and output of a computing device to perform tasks based on the user's spoken commands. The combination of speech recognition and natural language understanding processing is referred to herein as speech processing. Such TTS and speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates an exemplary system overview according to embodiments of the present disclosure.

FIG. 2 illustrates components for performing text-to-speech (TTS) processing according to embodiments of the present disclosure.

FIGS. 3A and 3B illustrate speech synthesis using unit selection according to embodiments of the present disclosure.

FIG. 5 illustrates a speech model for generating audio data according to embodiments of the present disclosure.

FIGS. 8A and 8B illustrate conditioning models for upsampling audio metadata according to embodiments of the present disclosure.

FIG. 9 illustrates training a speech model according to embodiments of the present disclosure.

FIG. 14 illustrates a diagram conceptually illustrating distributed computing environment according to embodiments of the present disclosure.

DETAILED DESCRIPTION

Figure 3A:
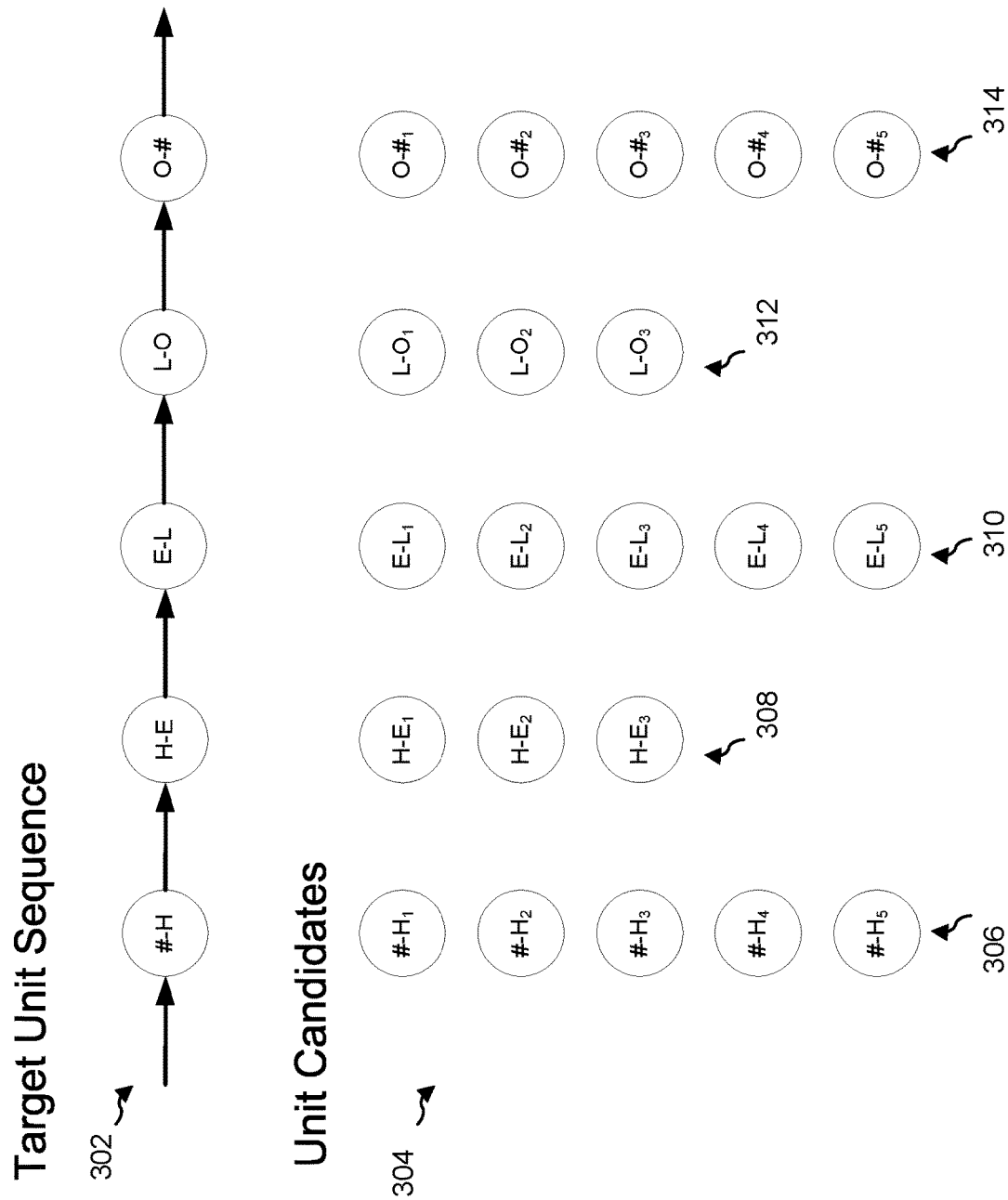

Text-to-speech (TTS) systems typically work using one of two techniques, each of which is described in more detail below. A first technique, called unit selection or concatenative TTS, processes and divides pre-recorded speech into many different segments of audio data, called units. The pre-recorded speech may be obtained by recording a human speaking many lines of text. Each segment that the speech is divided into may correspond to a particular audio unit such as a phoneme, diphone, or other length of sound. The individual units and data describing the units may be stored in a unit database, also called a voice corpus or voice inventory. When text data is received for TTS processing, the system may select the units that correspond to how the text should sound and may combine them to generate, i.e., synthesize, the audio data that represents the desired speech.

A second technique, called parametric synthesis or statistical parametric speech synthesis (SPSS), may use computer models and other data processing techniques to generate sound that is not based on pre-recorded speech (e.g., speech recorded prior to receipt of an incoming TTS request) but rather uses computing parameters to create output audio data. Vocoders are examples of components that can produce speech using parametric synthesis. Parametric synthesis may provide a large range of diverse sounds that may be computer-generated at runtime for a TTS request.

Each of these techniques, however, suffer from drawbacks. For unit selection, it may take many hours of recorded speech to create a sufficient voice inventory for eventual unit selection. Further, in order to have output speech having desired audio qualities, the human speaker used to record the speech needs to speak with the desired audio quality, which can be time consuming. For example, if the system is to be configured to be able to synthesize whispered speech using unit selection, a human user may need to read text in a whisper for hours to record enough sample speech to create a unit selection voice inventory that can be used to synthesized whispered speech. The same is true for speech with other qualities such as stern speech, excited speech, happy speech, etc. Thus, a typical voice inventory only includes mostly neutral speech or speech that does not typically include such extreme emotive or other non-standard audio characteristics. Further, a particular voice inventory may be recorded by a particular voice actor fitting a certain voice profile and in a certain language, e.g., male Australian English, female Japanese, etc. To configure individual voice inventories for all the combinations of language, voice profiles, audio qualities, etc., may be prohibitive.

Parametric synthesis, while typically more flexible at runtime, has historically not been able to create more natural sounding output speech than unit selection. While a speech model may be trained to predict, based on input text, speech parameters—i.e., features that describe a speech waveform to be created based on the speech parameters—parametric systems still require that manually crafted assumptions be used to create the vocoders, which lead to a reduction in generated speech quality. Hybrid synthesis, which combines aspects of unit selection and parametric synthesis, may, however, still lead to less natural sounding output than custom-tailored unit selection due to reliance on parametric synthesis when no appropriate unit may be suitable for given input text.

To address these deficiencies, one or more machine-learning model(s) may be trained to directly generate audio data, for example audio output waveforms. The speech model may generate the audio data sample-by-sample. As explained in further detail below, the speech model may include a sample model, a conditioning model, and/or an output model—which may also be referred to as a sample network, conditioning network, and/or output network, respectively. The speech model may create tens of thousands of samples per second of audio; in some embodiments, the rate of output audio samples is 16 kHz. The speech model may be fully probabilistic and/or autoregressive; the predictive distribution of each audio sample may be conditioned on all previous audio samples. As explained in further detail below, the speech model may use causal convolutions to predict output audio; in some embodiments, the speech model uses dilated convolutions to generate an output sample using a greater area of input samples than would otherwise be possible. The speech model may be trained using a conditioning model that conditions hidden layers of the network using linguistic context features, such as phoneme data. The audio output generated by the speech model may have higher audio quality than either unit selection or parametric synthesis.

The speech model may be trained to generate audio data corresponding to an audio output that resembles a vocal attribute—such as a style, tone, language, or other vocal attribute of a particular speaker—using training data from one or more human speakers. Additional training, more varied training data, a larger model, and/or other such factors may lead to an improvement in output audio quality, as measured by any of a number of audio quality metrics. A point may be reached, however, at which additional training and/or model resources may not lead to additional output audio quality or may lead to diminished returns in output audio quality. For example, the model may be trained simply by determining whether a waveform predicted by the speech model is "correct" or not based on, for example, how well it matches input training data. This measure of "correctness" may not be, however, correlated with how a human being perceives the quality of the output waveform. In various embodiments of the present disclosure, the speech model may be trained using a primary or main task, such as one directly related to output audio "correctness," as well as one or more secondary tasks, which may relate to certain perceptible aspects of output audio quality. The secondary task(s) may be used to influence the training of the speech model at training time even though they are not directly used at runtime, but may lead to improvements in output audio quality above and beyond those possible when training using only the main task.

An exemplary system overview is described in reference to FIG. 1. As shown in FIG. 1, a system 100 may include one or more server(s) 120 connected over a network 199 to one or more device(s) 110 that are local to a user 10. The server(s) 120 may be one physical machine capable of performing various operations described herein or may include several different machines, such as in a distributed computing environment, that combine to perform the operations described herein. The server(s) 120 and/or device(s) 110 may produce output audio 15 in accordance with the embodiments described herein. A speech model is trained at least in part by training (130), using a first section of a model (which may correspond to a layer of the model), a hidden layer of the speech model in accordance with a first task. The speech model is further trained (132) using a second section of the model, the hidden layer of the speech model in accordance with a second task. The first section is included (134), and the second section is discarded (136). Text data is received (138) from a text-to-speech front end; text metadata is also received (140). First audio output is generated (142) using the text data, the text metadata, and the speech model.

Components of a system that may be used to perform unit selection, parametric TTS processing, and/or model-based audio synthesis are shown in FIG. 2. In various embodiments of the present invention, model-based synthesis of audio data may be performed using by a speech model 222 and a TTS front-end 216. The TTS front-end 216 may be the same as front ends used in traditional unit selection or parametric systems. In other embodiments, some or all of the components of the TTS front end 216 also based on other trained models. The present invention is not, however, limited to any particular type of TTS front end 216. The speech model 222 may be included in a different component, such as a parametric engine component 232 or may be configured differently within the TTS module 295.

As shown in FIG. 2, the TTS component/processor 295 may include a TTS front end 216, a speech synthesis engine 218, TTS unit storage 272, and TTS parametric storage 280. The TTS unit storage 272 may include, among other things, voice inventories 278a-288n that may include pre-recorded audio segments (called units) to be used by the unit selection engine 230 when performing unit selection synthesis as described below. The TTS parametric storage 280 may include, among other things, parametric settings 268a-268n that may be used by the parametric synthesis engine 232 when performing parametric synthesis as described below. A particular set of parametric settings 268 may correspond to a particular voice profile (e.g., whispered speech, excited speech, etc.). The speech model 222 may be used to synthesize speech without requiring the TTS unit storage 272 or the TTS parametric storage 280, as described in greater detail below.

The TTS front end 216 transforms input text data 210 (for example from some speechlet component or other text source) into a symbolic linguistic representation, which may include linguistic context features, fundamental frequency information, or other such information, for processing by the speech synthesis engine 218. The input text data 210 may be, for example, ASCII text, compressed text, or any other similar representation of text, and may be received from a user (from, e.g., a text-based query or command) or may be generated from audio data (from, e.g., an audio-based query or command). The TTS front end 216 may also process tags or other input data 215 input to the TTS component 295 that indicate how specific words should be pronounced; the other input data 215 may, for example, indicate the desired output speech quality using tags formatted according to the speech synthesis markup language (SSML) or in some other form. For example, a first tag may be included with text marking the beginning of when text should be whispered (e.g., <begin whisper>) and a second tag may be included with text marking the end of when text should be whispered (e.g., <end whisper>). The tags may be included in the input text data and/or the text for a TTS request may be accompanied by separate metadata indicating what text should be whispered (or have some other indicated audio characteristic). The speech synthesis engine 218 compares the annotated phonetic units models and information stored in the TTS unit storage 272 and/or TTS parametric storage 280 for converting the input text into speech. The TTS front end 216 and speech synthesis engine 218 may include their own controller(s)/processor(s) and memory or they may use the controller/processor and memory of the server 120, device 110, or other device, for example. Similarly, the instructions for operating the TTS front end 216 and speech synthesis engine 218 may be located within the TTS component 295, within the memory and/or storage of the server 120, device 110, or within an external device.

Text data 210 input into a TTS component 295 may be sent to the TTS front end 216 for processing. The front-end may include components for performing text normalization, linguistic analysis, linguistic prosody generation, or other such components. During text normalization, the TTS front end 216 may process the text input and generate standard text, converting such things as numbers, abbreviations (such as Apt., St., etc.), symbols ($, %, etc.) into the equivalent of written out words.

During linguistic analysis the TTS front end 216 analyzes the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 295 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage component 272. The linguistic analysis performed by the TTS front end 216 may also identify different grammatical components such as prefixes, suffixes, phrases, punctuation, syntactic boundaries, or the like. Such grammatical components may be used by the TTS component 295 to craft a natural sounding audio waveform output. The language dictionary may also include letter-to-sound rules and other tools that may be used to pronounce previously unidentified words or letter combinations that may be encountered by the TTS component 295. Generally, the more information included in the language dictionary, the higher quality the speech output.

Based on the linguistic analysis the TTS front end 216 may then perform linguistic prosody generation where the phonetic units are annotated with desired prosodic characteristics, also called acoustic features, which indicate how the desired phonetic units are to be pronounced in the eventual output speech. During this stage the TTS front end 216 may consider and incorporate any prosodic annotations (for example as input text metadata 215) that accompanied the text input to the TTS component 295. Such acoustic features may include pitch, energy, duration, and the like. Application of acoustic features may be based on prosodic models available to the TTS component 295. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 216, which may be referred to as a symbolic linguistic representation, may include a sequence of phonetic units annotated with prosodic characteristics. This symbolic linguistic representation may be sent to the speech synthesis engine 218, which may also be known as a synthesizer, for conversion into an audio waveform of speech for output to an audio output device and eventually to a user. The speech synthesis engine 218 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 218 may perform speech synthesis using one or more different methods. In one method of synthesis called unit selection, described further below, a unit selection engine 230 matches the symbolic linguistic representation created by the TTS front end 216 against a database of recorded speech, such as a database (e.g., TTS unit storage 272) storing information regarding one or more voice corpuses (e.g., voice inventories 278*a-n*). Each voice inventory may correspond to various segments of audio that was recorded by a speaking human, such as a voice actor, where the segments are stored in an individual inventory 278 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 230 may then use the information about each unit to select units to be joined together to form the speech output.

The unit selection engine 230 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 220) to form output audio data 290 representing synthesized speech. The output audio data 290 may be formatted as MP3, OGG, WAV, or other audio data formats, and may have a data rate of 16 kHz. The TTS module 295 may further output other output data 285, which may include audio data such as tones or beeps, similarly formatted as MP3, OGG, WAV, or other audio data formats, text data, or any other data format. Using all the information in the unit database, a unit selection engine 230 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis called parametric synthesis parameters such as frequency, volume, noise, are varied by a parametric synthesis engine 232, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 220) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 295 may be configured to perform TTS processing in multiple languages. For each language, the TTS component 295 may include specially configured data, instructions and/or components to synthesize speech in the desired language(s). To improve performance, the TTS component 295 may revise/update the contents of the TTS storage 280 based on feedback of the results of TTS processing, thus enabling the TTS component 295 to improve speech recognition.

The TTS storage module 295 may be customized for an individual user based on his/her individualized desired speech output. In particular, the speech unit stored in a unit database may be taken from input audio data of the user speaking. For example, to create the customized speech output of the system, the system may be configured with multiple voice inventories 278a-278n, where each unit database is configured with a different "voice" to match desired speech qualities. Such voice inventories may also be linked to user accounts. The voice selected by the TTS component 295 to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 278 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 268) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed as follows. Unit selection includes a two-step process. First a unit selection engine 230 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 230. As part of unit selection, the unit selection engine 230 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 272 or in another storage component. For example, different unit selection databases may be stored in TTS unit storage 272. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 218 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output. An example of how unit selection is performed is illustrated in FIGS. 3A and 3B.

For example, as shown in FIG. 3A, a target sequence of phonetic units 310 to synthesize the word "hello" is determined by a TTS device. As illustrated, the phonetic units 310 are individual diphones, though other units, such as phonemes, etc. may be used. A number of candidate units may be stored in the voice corpus. For each phonetic unit indicated as a match for the text, there are a number of potential candidate units (represented by columns 306, 308, 310, 312 and 314) available. Each candidate unit represents a particular recording of the phonetic unit with a particular associated set of acoustic and linguistic features. For example, column 306 represents potential diphone units that correspond to the sound of going from silence (#) to the middle of an H sound, column 306 represents potential diphone units that correspond to the sound of going from the middle of an H sound to the middle of an E (in hello) sound, column 310 represents potential diphone units that correspond to the sound of going from the middle of an E (in hello) sound to the middle of an L sound, column 312 represents potential diphone units that correspond to the sound of going from the middle of an L sound to the middle of an O (in hello sound), and column 314 represents potential diphone units that correspond to the sound of going from the middle of an O (in hello sound) to silence.

The individual potential units are selected based on the information available in the voice inventory about the acoustic properties of the potential units and how closely each potential unit matches the desired sound for the target unit sequence 302. How closely each respective unit matches the desired sound will be represented by a target cost. Thus, for example, unit #-$H_1$ will have a first target cost, unit #-$H_2$ will have a second target cost, unit #-$H_3$ will have a third target cost, and so on.

The TTS system then creates a graph of potential sequences of candidate units to synthesize the available speech. The size of this graph may be variable based on certain device settings. An example of this graph is shown in FIG. 3B. A number of potential paths through the graph are illustrated by the different dotted lines connecting the candidate units. A Viterbi algorithm may be used to determine potential paths through the graph. Each path may be given a score incorporating both how well the candidate units match the target units (with a high score representing a low target cost of the candidate units) and how well the candidate units concatenate together in an eventual synthesized sequence (with a high score representing a low join cost of those respective candidate units). The TTS system may select the sequence that has the lowest overall cost (represented by a combination of target costs and join costs) or may choose a sequence based on customized functions for target cost, join cost or other factors. For illustration purposes, the target cost may be thought of as the cost to select a particular unit in one of the columns of FIG. 3B whereas the join cost may be thought of as the score associated with a particular path from one unit in one column to another unit of another column. The candidate units along the selected path through the graph may then be combined together to form an output audio waveform representing the speech of the input text. For example, in FIG. 3B the selected path is represented by the solid line. Thus units #-$H_2$, $H$-$E_1$, $E$-$L_4$, $L$-$O_3$, and $O$-$\#_4$ may be selected, and their respective audio concatenated by synthesis component 220, to synthesize audio for the word "hello." This may continue for the input text data 210 to determine output audio data.

Vocoder-based parametric speech synthesis may be performed as follows. A TTS component 295 may include an acoustic model, or other models, which may convert a symbolic linguistic representation into a synthetic acoustic waveform of the text input based on audio signal manipulation. The acoustic model includes rules which may be used by the parametric synthesis engine 232 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 216.

The parametric synthesis engine 232 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 218, the state may change or stay the same, based on the processing of the new text. For example, the pronunciation of a previously processed word might change based on later processed words. A Viterbi algorithm may be used to find the most likely sequence of states based on the processed text. The HMMs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

Figure 4:
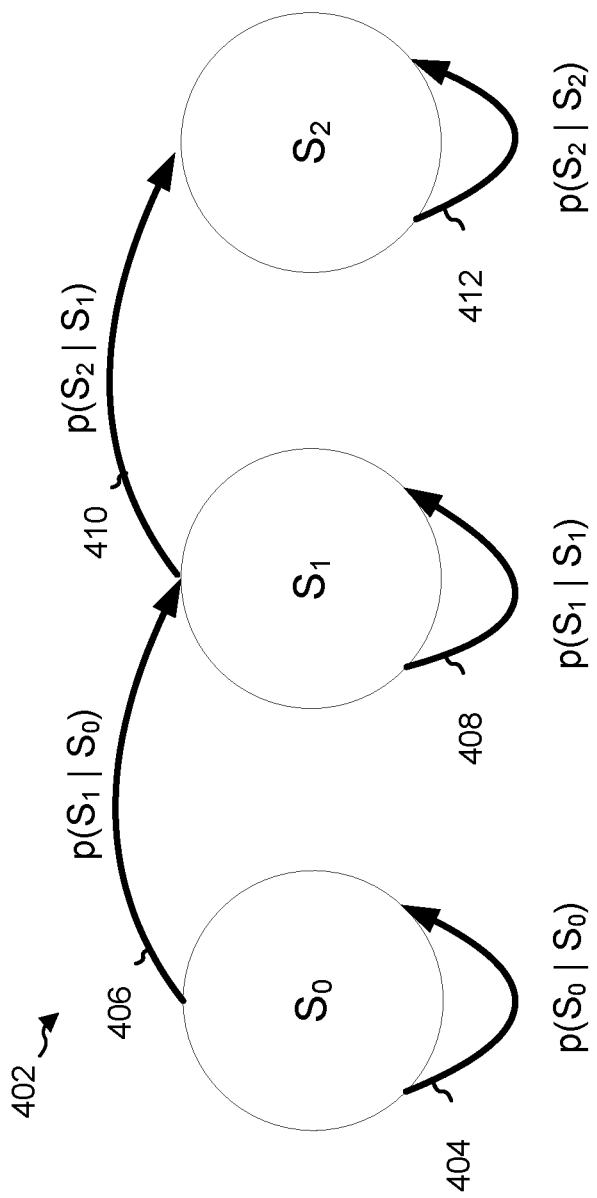
FIG. 4 illustrates speech synthesis using a Hidden Markov Model to perform TTS processing according to embodiments of the present disclosure.

An example of HMM processing for speech synthesis is shown in FIG. 4. A sample input phonetic unit may be processed by a parametric synthesis engine 232. The parametric synthesis engine 232 may initially assign a probability that the proper audio output associated with that phoneme is represented by state $S_0$ in the Hidden Markov Model illustrated in FIG. 4. After further processing, the speech synthesis engine 218 determines whether the state should either remain the same, or change to a new state. For example, whether the state should remain the same 404 may depend on the corresponding transition probability (written as $P(S_0|S_0)$, meaning the probability of going from state $S_0$ to $S_0$) and how well the subsequent frame matches states $S_0$ and $S_1$. If state $S_1$ is the most probable, the calculations move to state $S_1$ and continue from there. For subsequent phonetic units, the speech synthesis engine 218 similarly determines whether the state should remain at $S_1$, using the transition probability represented by $P(S_1|S_1)$ 408, or move to the next state, using the transition probability $P(S_2|S_1)$ 410. As the processing continues, the parametric synthesis engine 232 continues calculating such probabilities including the probability 412 of remaining in state $S_2$ or the probability of moving from a state of illustrated phoneme/E/ to a state of another phoneme. After processing the phonetic units and acoustic features for state $S_2$, the speech recognition may move to the next phonetic unit in the input text.

The probabilities and states may be calculated using a number of techniques. For example, probabilities for each state may be calculated using a Gaussian model, Gaussian mixture model, or other technique based on the feature vectors and the contents of the TTS storage 280. Techniques such as maximum likelihood estimation (MLE) may be used to estimate the probability of particular states.

In addition to calculating potential states for one audio waveform as a potential match to a phonetic unit, the parametric synthesis engine 232 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 232 may lead to a number of potential audio output sequences. Based on the acoustic model and other potential models, the potential audio output sequences may be scored according to a confidence level of the parametric synthesis engine 232. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 268, which may represent acoustic settings matching a particular parametric "voice", may be used by the synthesis component 220 to ultimately create the output audio data 290.

FIG. 5 illustrates an embodiment of the speech model 222, which may include a sample model 502, an output model 504, and a conditioning model 506, each of which are described in greater detail below. The TTS front end 216 may receive input text data 210 and generate metadata 508, which may be formatted as text, as a feature vector, or as any other format, and may include input text, phoneme data, duration data, and/or fundamental frequency (F0) data, as described in greater detail below. During training, the metadata 508 may include prerecorded audio data and corresponding text data created for training the speech model 222. In some embodiments, during runtime, the TTS front end 216 includes a first-pass speech synthesis engine that creates speech using, for example, the unit selection and/or parametric synthesis techniques described above.

The sample model 502 may include a dilated convolution component 512. The dilated convolution component 512 performs a filter over an area of the input larger than the length of the filter by skipping input values with a certain step size, depending on the layer of the convolution. For example, the dilated convolution component 512 may operate on every sample in the first layer, every second sample in the second layer, every fourth sample in the third layer, and so on. The dilated convolution component 512 may effectively allow the speech model 222 to operate on a coarser scale than with a normal convolution. The input to the dilated convolution component 512 may be, for example, a vector of size r created by performing a 2×1 convolution and a tanh function (also known as a hyperbolic tangent function) on an input audio one-hot vector. The output of the dilated convolution component 512 may be a vector of size 2r.

An activation/combination component 514 may combine the output of the dilated convolution component 512 with one or more outputs of the conditioning model 506, as described in greater detail below, and/or operated on by one or more activation functions, such as tanh or sigmoid functions, as also described in greater detail below. The activation/combination component 514 may combine the 2r vector output by the dilated convolution component 512 into a vector of size r. The present disclosure is not, however, limited to any particular architecture related to activation and/or combination.

The output of the activation/combination component 514 may be combined, using a combination component 516, with the input to the dilated convolution component 512. In some embodiments, prior to this combination, the output of the activation/combination component 514 is convolved by a second convolution component 518, which may be a 1×1 convolution on r values.

The sample model 502 may include one or more layers, each of which may include some or all of the components described above. In some embodiments, the sample model 502 includes 40 layers, which may be configured in four blocks with ten layers per block; the output of each combination component 516, which may be referred to as residual channels, may include 128 values; and the output of each convolution/affine component 520, which may be referred to as skip channels or skip outputs, may include 1024 values. The dilation performed by the dilated convolution component 512 may be $2^n$ for each layer n, and may be reset at each block.

The first layer may receive the metadata 508 as input; the output of the first layer, corresponding to the output of the combination component 514, may be received by the dilated convolution component 512 of the second layer. The output of the last layer may be unused. As one of skill in the art will understand, a greater number of layers may result in higher-quality output speech at the cost of greater computational complexity and/or cost; any number of layers is, however, within the scope of the present disclosure. In some embodiments, the number of layers may be limited in the latency between the first layer and the last layer, as determined by the characteristics of a particular computing system, and the output audio rate (e.g., 16 kHz).

A convolution/affine component 520 may receive the output (of size r) of the activation/combination component 514 and perform a convolution (which may be a 1×1 convolution) or an affine transformation to produce an output of size s, wherein s<r. In some embodiments, this operation may also be referred to as a skip operation or a skip-connection operation, in which only a subset of the outputs from the layers of the sample model 502 are used as input by the convolution/affine component 520. The output of the convolution/affine component 520 may be combined using a second combination component 522, the output of which may be received by an output model 524 to create output audio data 290, which is also explained in greater detail below. One or more outputs of the output model 524 may be fed back to the sample model 502 instead of or in addition to the metadata 508.

Figure 6A:
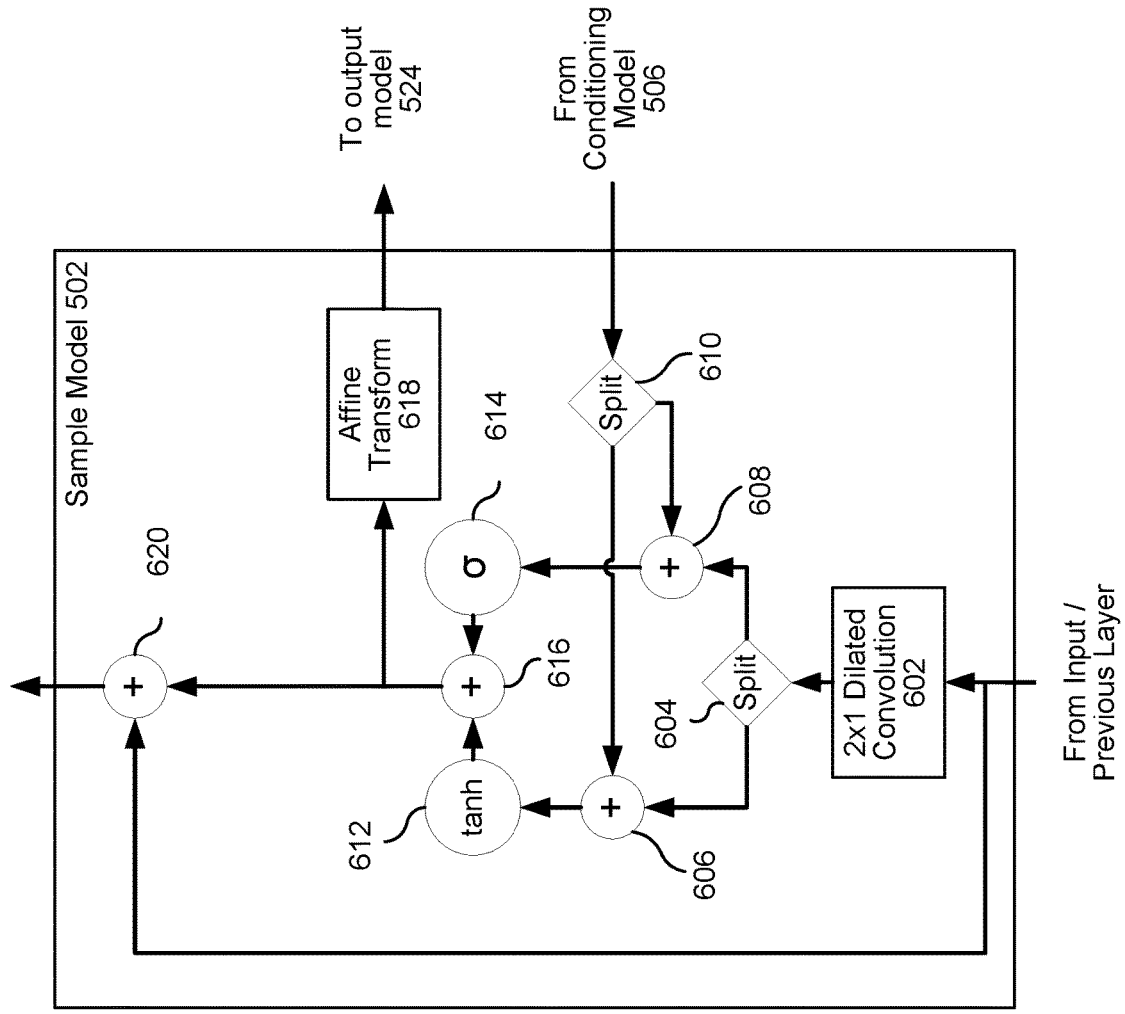
FIGS. 6A and 6B illustrate sample models for generating audio sample components according to embodiments of the present disclosure.
Figure 6B:
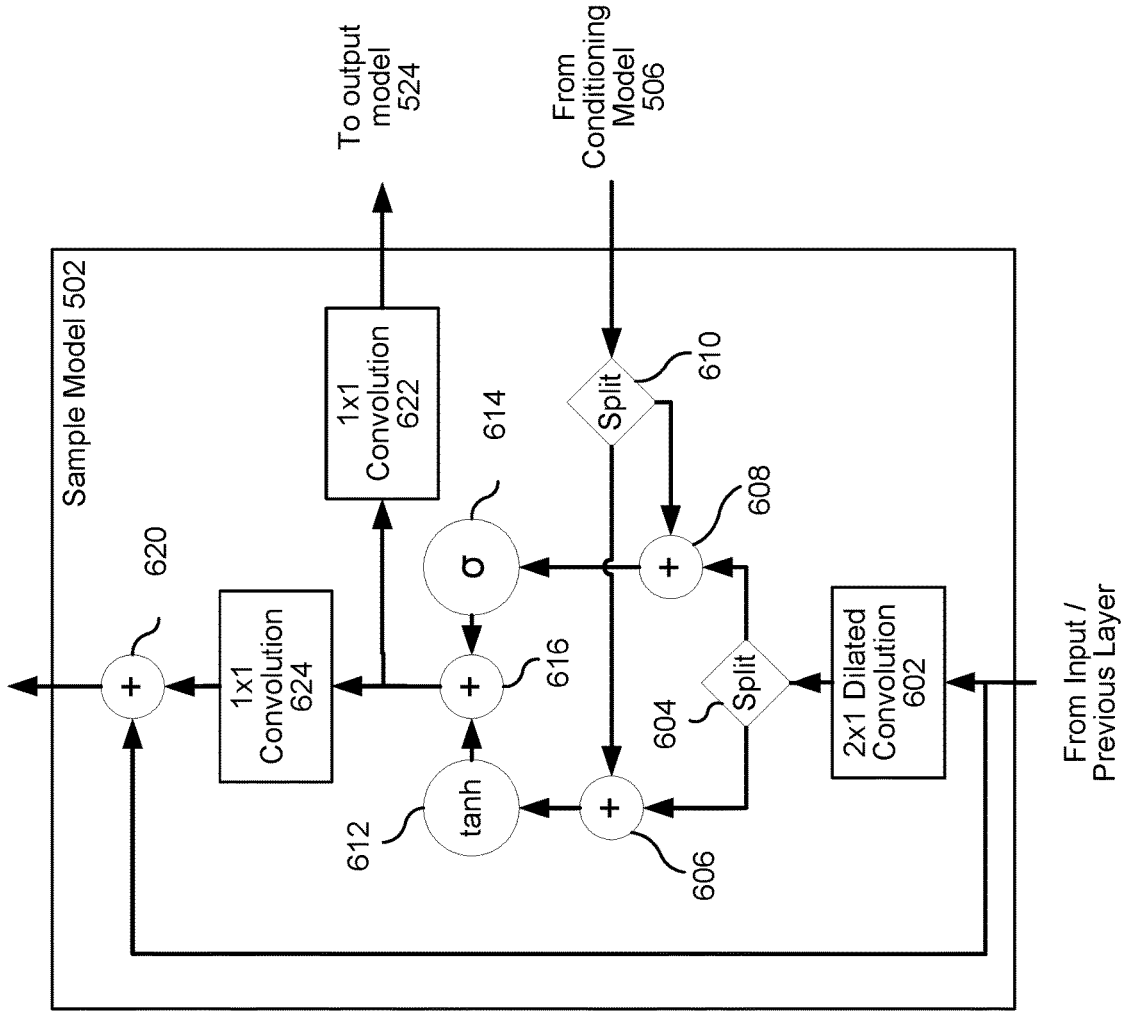

FIGS. 6A and 6B illustrate embodiments of the sample model 502. Referring first to FIG. 6A, a 2×1 dilated convolution component 602 receives a vector of size r from the TTS front end 216 or from a previous layer of the sample model 502 and produces an output of size 2r. A split component 604 splits this output into two vectors, each of size r; these vectors are combined, using combination components 606 and 608, which the output of the conditioning model 506, which has been similarly split by a second split component 610. A tanh component 612 performs a tanh function on the first combination, a sigmoid (σ) component 614 performs a sigmoid function on the second combination, and the results of each function are combined using a third combination component 616. An affine transformation component 618 performs an affine transformation on the result and outputs the result to the output model 524. A fourth combination component 620 combines the output of the previous combination with the input and outputs the result to the next layer, if any.

Referring to FIG. 6B, many of the same functions described above with reference to FIG. 6A are performed. In this embodiment, however, a 1×1 convolution component 622 performs a 1×1 convolution on the output of the third combination component 616 in lieu of the affine transformation performed by the affine transformation component 618 of FIG. 6A. In addition, a second 1×1 convolution component 624 performs a second 1×1 convolution on the output of the third combination component 616, the output of which is received by the fourth combination component 620.

Figure 7A:
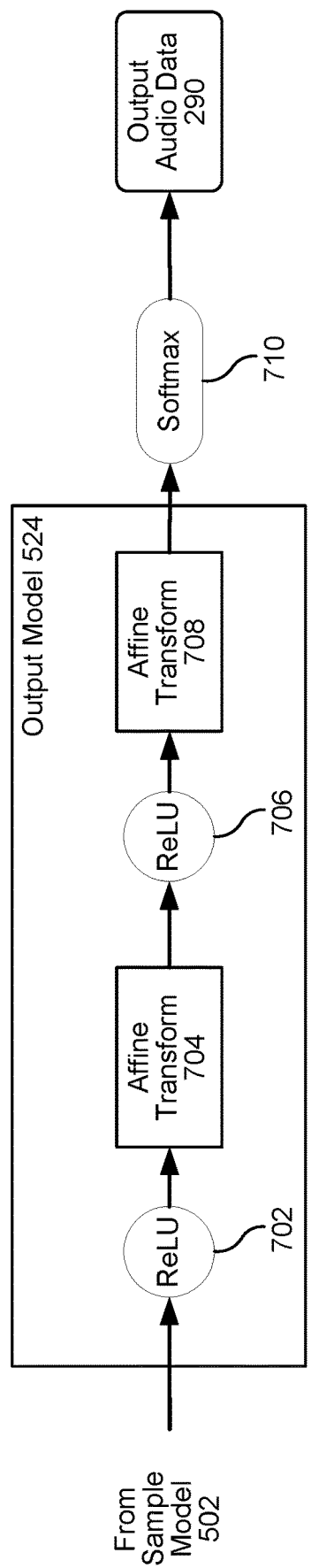
FIGS. 7A and 7B illustrate output models for generating audio samples from audio sample components according to embodiments of the present disclosure.
Figure 7B:
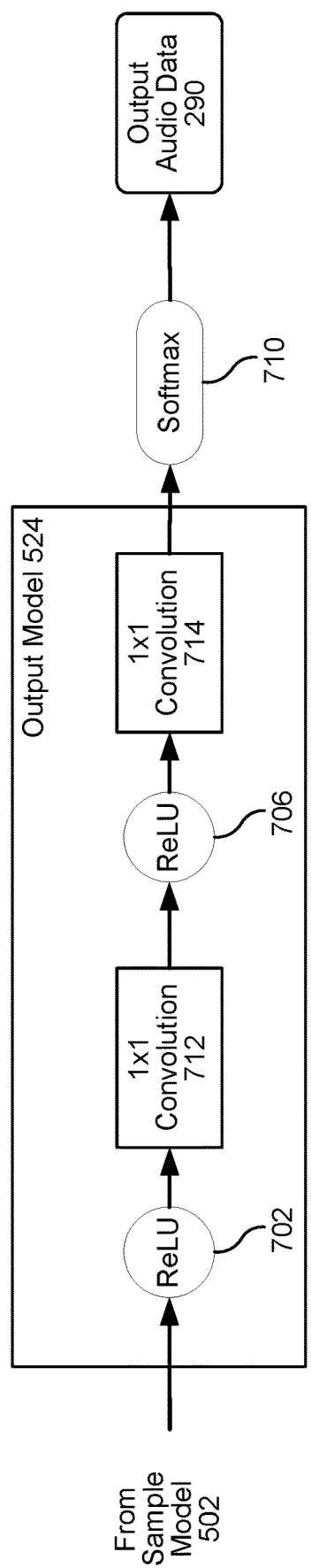

FIGS. 7A and 7B illustrate embodiments of the output model 524. Referring first to FIG. 7A, a first rectified linear unit (ReLU) 702 may perform a first rectification function on the output of the sample model 502, and a first affine transform component 704 may perform a first affine transform on the output of the ReLU 702. The input vector to the first affine transform component 704 may be of size s, and the output may be of size a. In various embodiments, s>a; a may represent the number of frequency bins corresponding to the output audio and may be of size ten. A second ReLU component 706 performs a second rectification function, and a second affine transform component 708 performs a second affine transform. A softmax component 710 may be used to generate output audio data 290 from the output of the second affine transform component 708 by, for example, transforming its input into a number of values between 0 and 1 in which all of the values add up to 1. FIG. 7B is similar to FIG. 7A but replaces the affine transformation components 704, 708 with 1×1 convolution components 712, 714.

Figure 8B:
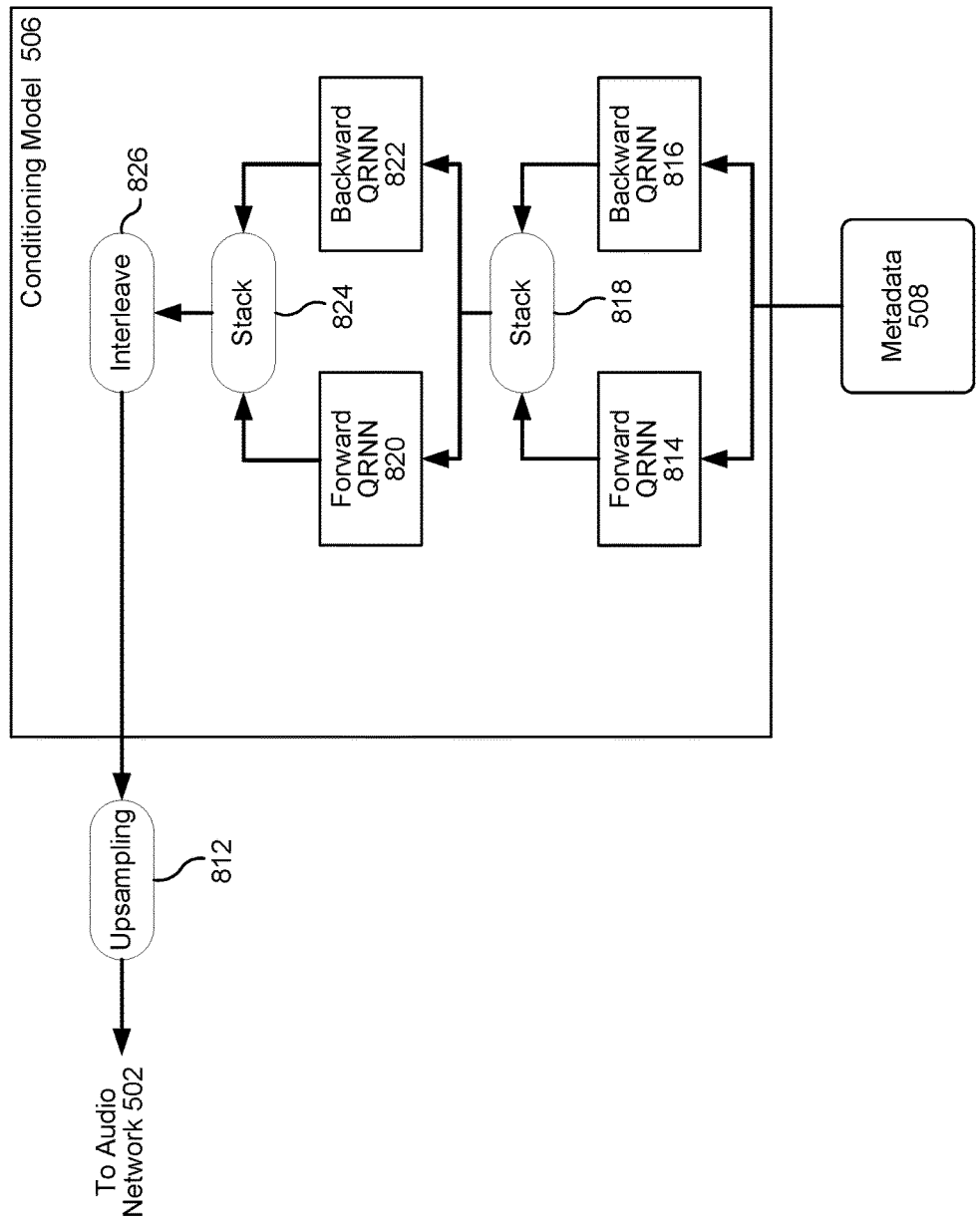

FIGS. 8A and 8B illustrate embodiments of the conditioning model 216. In various embodiments, the metadata 508 received by the conditioning model 216 is represented by a lower sample rate than the text/audio data received by the sample model 502. In some embodiments, the sample model 502 receives data sampled at 16 kHz while the conditioning model receives data sampled at 256 Hz. The conditioning model 216 may thus upsample the lower-rate input so that it matches the higher-rate input received by the sample model 502.

Referring to FIG. 8A, the text and/or audio metadata 508 is received by a first forward long short-term memory (LSTM) 802 and a first backward LSTM 804. The input metadata 508 may include linguistic context features, fundamental frequency data, grapheme-to-phoneme data, duration prediction data, or any other type of data. In some embodiments, the input metadata 508 includes 86 linguistic context features; any number of context features is, however, within the scope of the present disclosure. The outputs of both LSTMs 802, 804 may be received by a first stack element 818, which may combine the outputs 802, 804 by summation, by concatenation, or by any other combination. The output of the first stack element 818 is received by both a second forward LSTM 806 and a second backward LSTM 808. The outputs of the second LSTMs 806, 808 are combined using a second stack element 824, the output of which is received by an affine transform component 810 and upsampled by an upsampling component 812. The output of the upsampling component 812, as mentioned above, is combined with the sample model 502 using an activation/combination element 514. This output of the upsampling component 812 represents an upsampled version of the metadata 508, may be referred to herein as conditioning data or prosody data, and may include numbers or vectors of numbers.

With reference to FIG. 8B, in this embodiment, the input text metadata 215 is received by a first forward quasi-recurrent neural network (QRNN) 814 and first backward QRNN 816, the outputs of which are combined by a first stack component 818. The output of the stack component 818 is received by a second forward QRNN 820 and a second backward QRNN 822. The outputs of the second QRNNs 820, 822 are combined by a second stack component 824, interleaved by an interleave component 826, and then upsampled by the upsampling component 812.

As mentioned above, the speech model 222 may be used with existing TTS front ends, such as those developed for use with the unit selection and parametric speech systems described above. In other embodiments, however, the TTS front end may include one or more additional models that may be trained using training data, similar to how the speech model 222 may be trained.

FIG. 9 illustrates an embodiment of such a model-based TTS front end 216. FIG. 9 illustrates the training of the TTS front end XB16 and of the speech model 222; FIG. SSK, described in more detail below, illustrates the trained TTS front end XB16 and speech model 222 at runtime. Training audio 902, which may be formatted as, for example, MP3, OGG, or WAV formats, and corresponding training text 904, which may be ASCII or similar format text, may be used to train the models. The training audio 902 may be captured using a human voice, and the training text 904 may be generated using a speech-to-text system and/or by a human transcriber.

A grapheme-to-phoneme model 906 may be trained to convert the training text 904 from text (e.g., text characters) to phonemes, which may be encoded using a phonemic alphabet such as ARPABET. The grapheme-to-phoneme model 906 may reference a phoneme dictionary 908. A segmentation model 910 may be trained to locate phoneme boundaries in the voice dataset using an output of the grapheme-to-phoneme model 906 and the training audio 902. Given this input, the segmentation model 910 may be trained to identify where in the training audio 902 each phoneme begins and ends. An acoustic feature model 912 may be trained to predict acoustic features of the training audio, such as whether a phoneme is voiced, the fundamental frequency (F0) throughout the phoneme's duration, or other such features. A phoneme duration prediction model 916 may be trained to predict the temporal duration of phonemes in a phoneme sequence (e.g., an utterance). The speech model receives, as inputs, the outputs of the grapheme-to-phoneme model 906, the duration prediction model 916, and the acoustic features model 912 and may be trained to synthesize audio at a high sampling rate, as described above.

Figure 10:
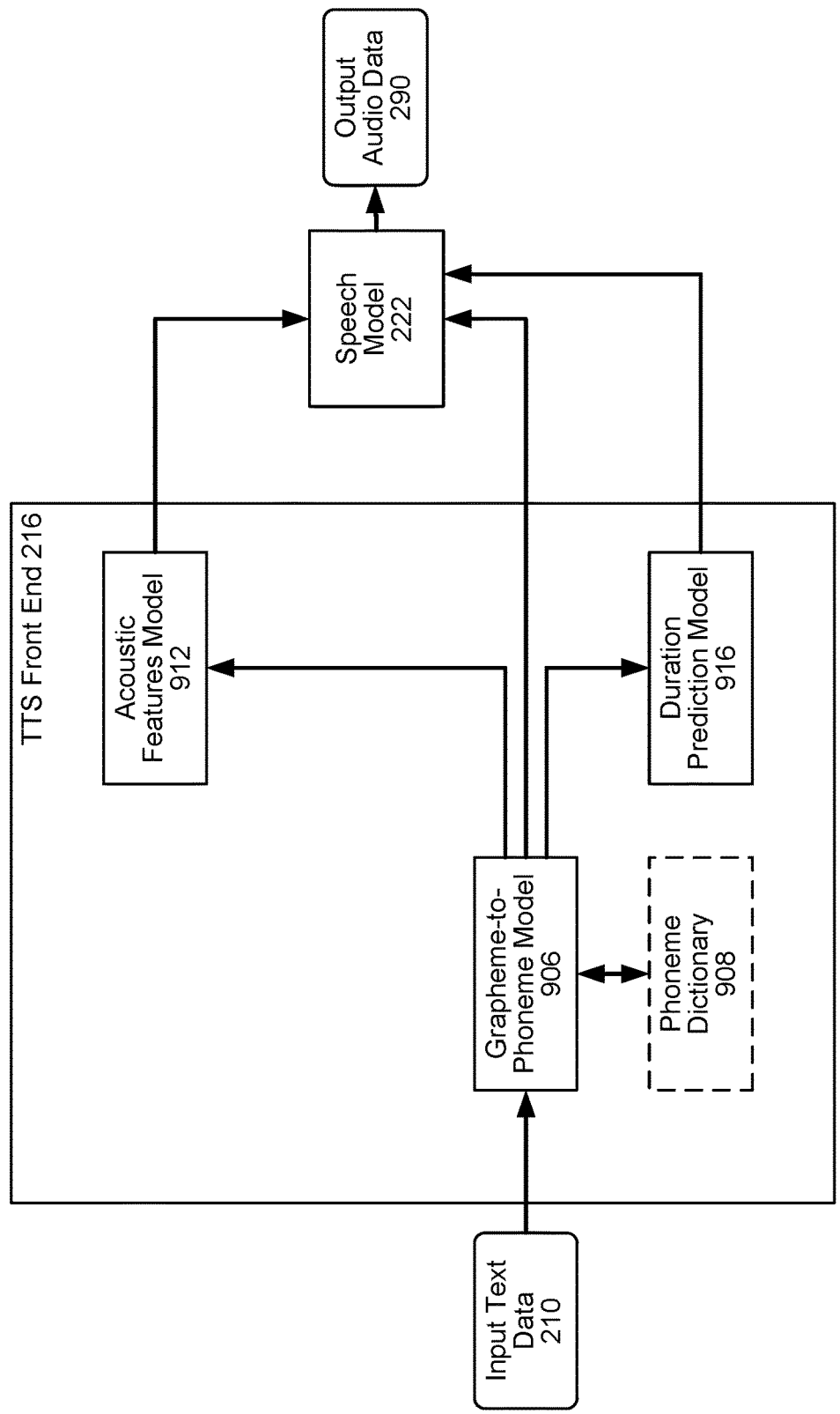
FIG. 10 illustrates runtime for a speech model according to embodiments of the present disclosure.

FIG. 10 illustrates use of the model-based TTS front end 216 and speech model 222 during runtime. The grapheme-to-phoneme model 906 receives input text data 210 and locates phoneme boundaries therein. Using this data, the acoustic features model 912 predicts acoustic features, such as fundamental frequencies of phonemes, and the duration prediction model 916 predicts durations of phonemes. Using the phoneme data, acoustic data, and duration, data, the speech model 222 synthesizes output audio data 290.

Figure 11:
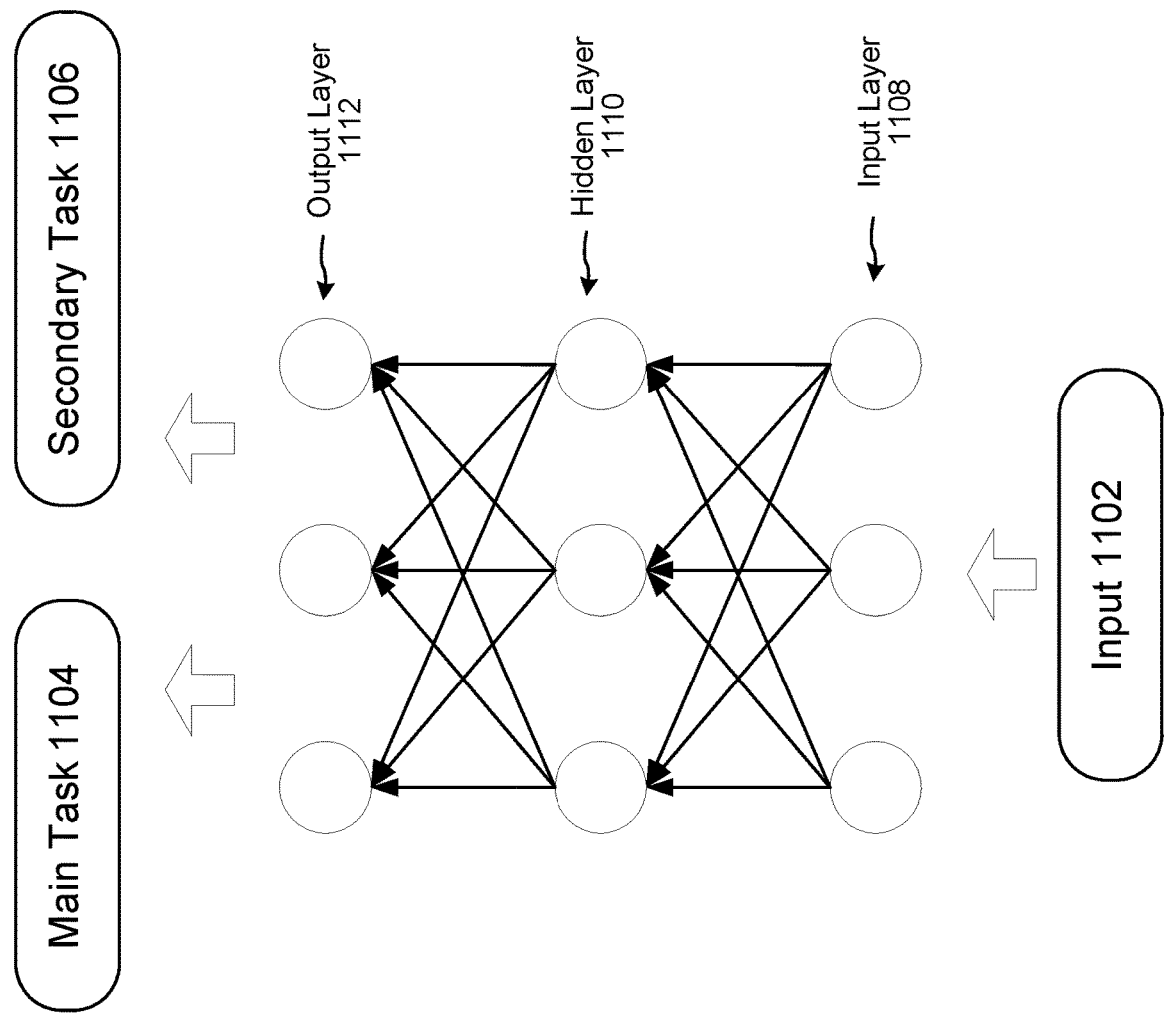
FIG. 11 illustrates training a network using multi-task training according to embodiments of the present disclosure.

FIG. 11 illustrates training a network, such as the sample model 502, conditioning subnetwork 506, and/or output model 524, using input data 1102, a main task 1104, and at least one secondary task 1106. This type of learning may be referred to as multi-task learning. As mentioned above, the network may include an input layer 1108, an output layer 1112, and one or more hidden layers 1110. As also mentioned above, the main task 1104 may be training the network to match the output audio data 290 generated by the network as closely as possible to the training data 902; this matching may, however, lead to changes in the network during training that do not improve the perceived quality of the output audio data 290 to a human listener. As a result, the training network may include complexity that has no benefit to a human listener.

In some embodiments, the one or more secondary tasks 1106 are added during training to improve the quality of the output audio data 290, reduce the size of the speech model 222, or both. The secondary task 1106 may be based on, for example, one or more standards of the perceptual evaluation of speech quality (PESQ). The secondary task 1106 may also or instead be based on, for example, the short-term power spectrum of the training data 902 and/or output audio data 290 represented by, for example, the mel-frequency cepstrum (MFC) of the training data 902, and/or output audio data 290. Basing the secondary task 1106 on the MFC may, for example, alter the frequency spectrum of the output audio data 290 to emphasize frequencies favored by the human ear and de-emphasize frequencies disfavored by the human ear. Any type of secondary task 1106 that improves the perceived quality of the output audio data 290 is, however, within the scope of the present disclosure.

In some embodiments, additional sections of the model—such as layers, nodes, components, or other elements—may be added to the speech model 222 to better accommodate the training of the secondary task 1106. These additional sections or layers may be added to, for example, the softmax component 710 in the output model 524, to the LSTM components 802, 804, 806, 808 in the conditioning model 506, and/or to other parts of the speech model 222. Some layers, such as the additional softmax layers, may correspond to the second task; other layers also used for training, such as the additional LSTM layers, may correspond to a third task also related to perceived quality, as recited above. In some embodiments, these additional sections or layers modify the training of the sample model 502 during training but are discarded and/or inactive in the speech model 222 during runtime.

Figure 12:
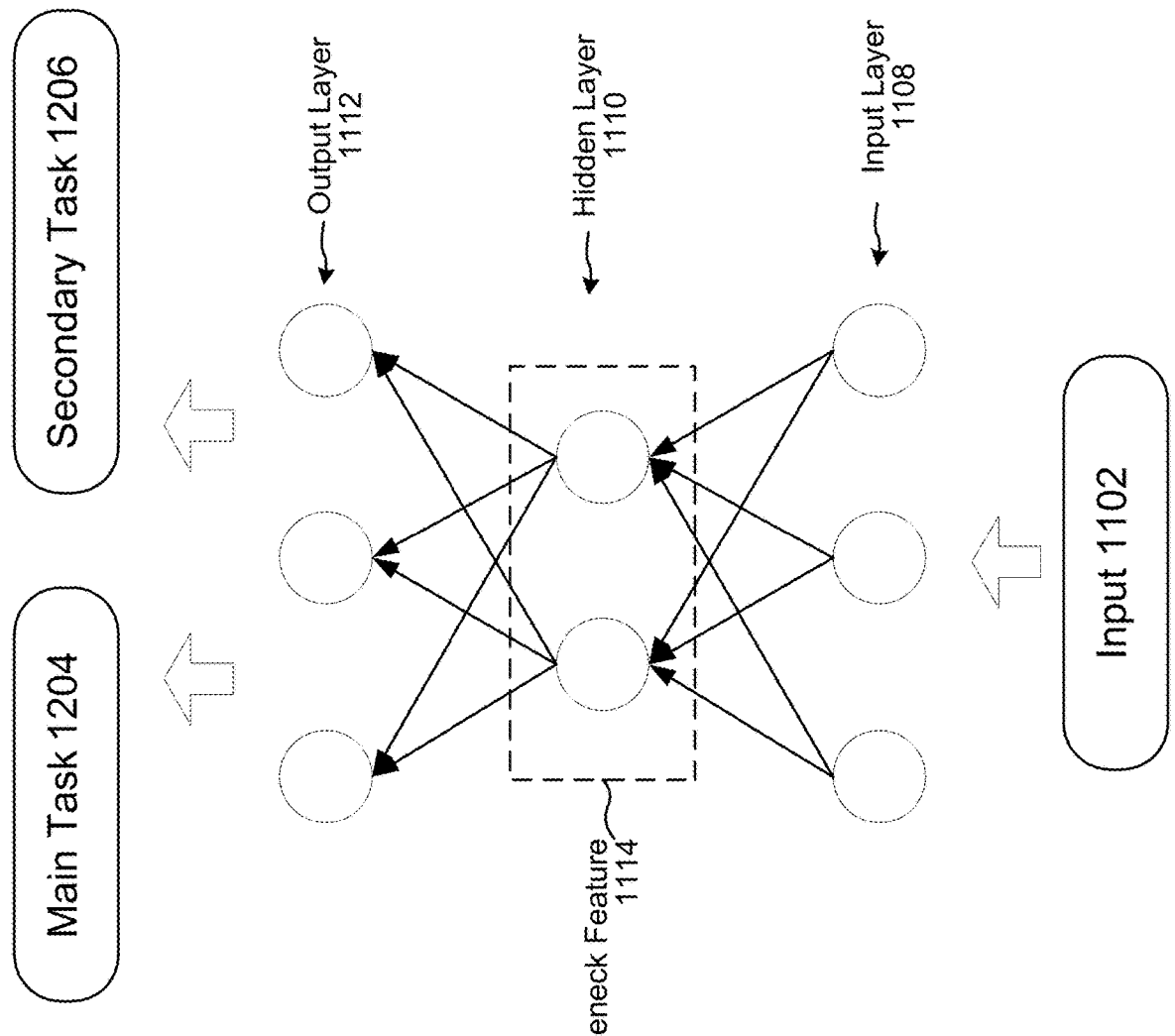
FIG. 12 illustrates training a network using a bottleneck according to embodiments of the present disclosure.

In some embodiments, with reference to FIG. 12, a bottleneck feature 1202 may be added to one or more hidden layers 1110. The bottleneck feature 1202 corresponds to removing one or more nodes from the hidden layer 1110 during training; the reduced number of nodes of the hidden layer 1110 may result in a greater control in training the hidden layer 1110 and/or a faster training time. In some embodiments, the values of the nodes in the bottleneck feature 1202 of the hidden layer 1110 are used as inputs to train a second model that does not include the bottleneck feature 1202; this second model may thereafter be used at runtime.

Audio waveforms (such as output audio data 290) including the speech output from the TTS component 295 may be sent to an audio output component, such as a speaker for playback to a user or may be sent for transmission to another device, such as another server 120, for further processing or output to a user. Audio waveforms including the speech may be sent in a number of different formats such as a series of feature vectors, uncompressed audio data, or compressed audio data. For example, audio speech output may be encoded and/or compressed by an encoder/decoder (not shown) prior to transmission. The encoder/decoder may be customized for encoding and decoding speech data, such as digitized audio data, feature vectors, etc. The encoder/decoder may also encode non-TTS data of the system, for example using a general encoding scheme such as .zip, etc.

Figure 13:
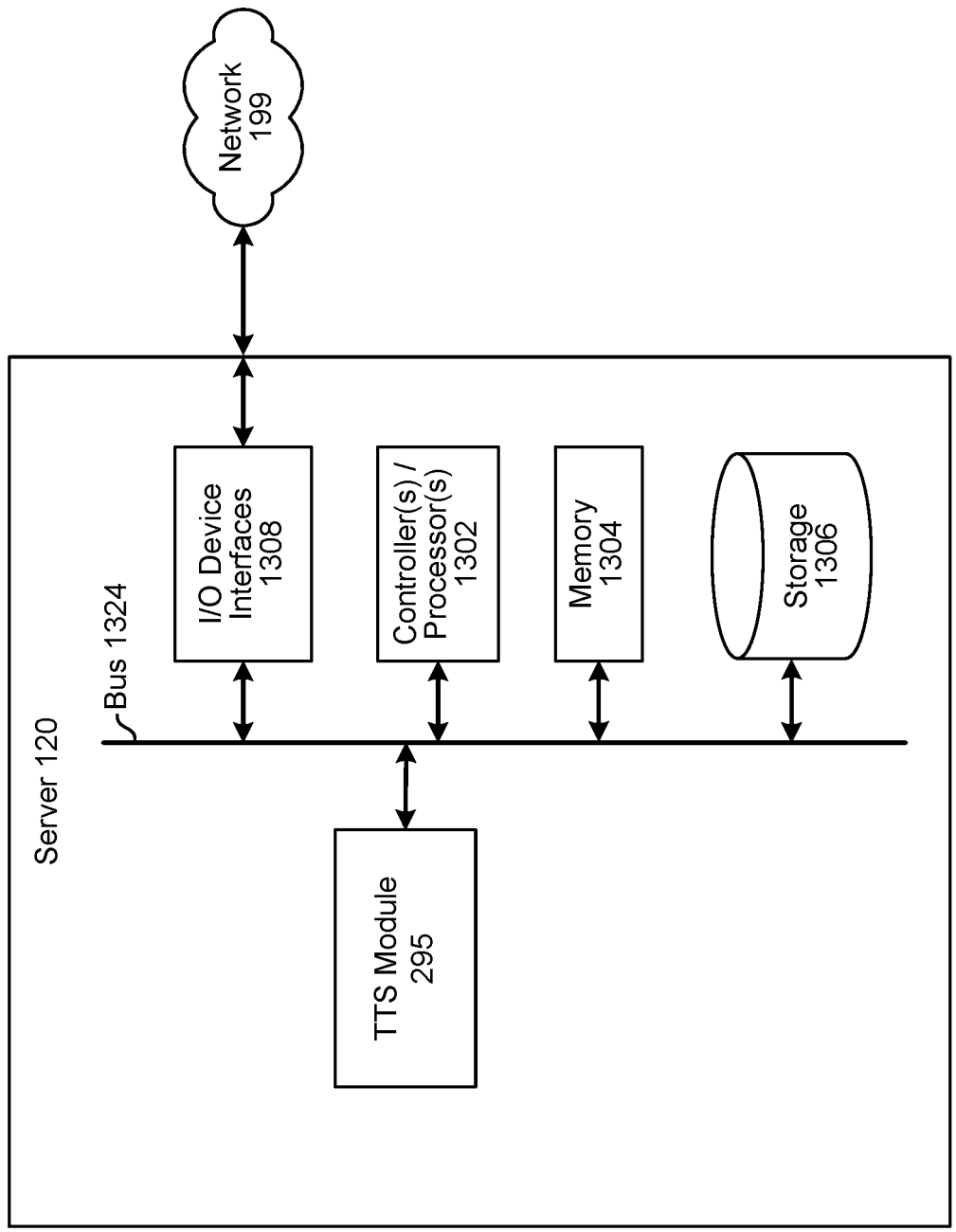
FIG. 13 illustrates is a block diagram conceptually illustrating example components of a remote device, such as server(s), that may be used with the system according to embodiments of the present disclosure.

Although the above discusses a system, one or more components of the system may reside on any number of devices. FIG. 13 is a block diagram conceptually illustrating example components of a remote device, such as server(s) 120, which may determine which portion of a textual work to perform TTS processing on and perform TTS processing to provide an audio output. Multiple such servers 120 may be included in the system, such as one server 120 for determining the portion of the textual to process using TTS processing, one server 120 for performing TTS processing, etc. In operation, each of these devices may include computer-readable and computer-executable instructions that reside on the server(s) 120, as will be discussed further below. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Each server 120 may include one or more controllers/processors (1302), which may each include a central processing unit (CPU) for processing data and computer-readable instructions, and a memory (1304) for storing data and instructions of the respective device. The memories (1304) may individually include volatile random access memory (RAM), non-volatile read only memory (ROM), non-volatile magnetoresistive (MRAM) and/or other types of memory. Each server may also include a data storage component (1306), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1308). The storage component 1306 may include storage for various data including ASR models, NLU knowledge base, entity library, speech quality models, TTS voice unit storage, and other storage used to operate the system.

Computer instructions for operating each server (120) and its various components may be executed by the respective server's controller(s)/processor(s) (1302), using the memory (1304) as temporary "working" storage at runtime. A server's computer instructions may be stored in a non-transitory manner in non-volatile memory (1304), storage (1306), or an external device(s). Alternatively, some or all of the executable instructions may be embedded in hardware or firmware on the respective device in addition to or instead of software.

The server (120) may include input/output device interfaces (1308). A variety of components may be connected through the input/output device interfaces, as will be discussed further below. Additionally, the server (120) may include an address/data bus (1310) for conveying data among components of the respective device. Each component within a server (120) may also be directly connected to other components in addition to (or instead of) being connected to other components across the bus (1310).

One or more servers 120 may include the TTS component 295, or other components capable of performing the functions described above.

As described above, the storage component 1306 may include storage for various data including speech quality models, TTS voice unit storage, and other storage used to operate the system and perform the algorithms and methods described above. The storage component 1306 may also store information corresponding to a user profile, including purchases of the user, returns of the user, recent content accessed, etc.

As noted above, multiple devices may be employed in a single system. In such a multi-device system, each of the devices may include different components for performing different aspects of the system. The multiple devices may include overlapping components. The components of the devices 110 and server(s) 120, as described with reference to FIG. 13, are exemplary, and may be located a stand-alone device or may be included, in whole or in part, as a component of a larger device or system.

As illustrated in FIG. 14, multiple devices may contain components of the system and the devices may be connected over a network 199. The network 199 is representative of any type of communication network, including data and/or voice network, and may be implemented using wired infrastructure (e.g., cable, CATS, fiber optic cable, etc.), a wireless infrastructure (e.g., WiFi, RF, cellular, microwave, satellite, Bluetooth, etc.), and/or other connection technologies. Devices may thus be connected to the network 199 through either wired or wireless connections. Network 199 may include a local or private network or may include a wide network such as the internet. For example, server(s) 120, smart phone 110b, networked microphone(s) 1404, networked audio output speaker(s) 1406, tablet computer 110d, desktop computer 110e, laptop computer 110f, speech device 110a, refrigerator 110c, etc. may be connected to the network 199 through a wireless service provider, over a WiFi or cellular network connection or the like.

As described above, a device, may be associated with a user profile. For example, the device may be associated with a user identification (ID) number or other profile information linking the device to a user account. The user account/ID/profile may be used by the system to perform speech controlled commands (for example commands discussed above). The user account/ID/profile may be associated with particular model(s) or other information used to identify received audio, classify received audio (for example as a specific sound described above), determine user intent, determine user purchase history, content accessed by or relevant to the user, etc.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the components, components and engines may be implemented as in firmware or hardware, including digital filters (e.g., filters configured as firmware to a digital signal processor (DSP)).

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the components and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for generating speech from text, the method comprising:
   training, using multi-task learning, to create a speech model, wherein:
      the speech model includes:
         a sample model configured to input text data and output audio samples, a conditioning model configured to input text metadata corresponding to the input text data and to condition the sample model, and
an output model configured to input the output audio samples and output audio output data, and
the training includes:
using a first section of the conditioning model, configuring at least one hidden layer of the sample model in accordance with a first task, wherein the first task includes minimizing a difference between the audio output data and corresponding training data;
using a second section of the conditioning model, configuring the at least one hidden layer of the sample model in accordance with a second task, wherein the second task includes maximizing a metric of perceived quality of the audio output data;
including the first section of the conditioning model in the speech model, and
discarding the second section of the conditioning model; and
generating, using first text data and the speech model, first audio output data corresponding to the input text data.

2. The computer-implemented method of claim 1, wherein maximizing the metric of perceived quality comprises at least one of:
computing, using the audio output data, a perceptual evaluation of speech quality (PESQ) standard; and
computing, using the audio output data, a mel-frequency cepstrum (WC).

3. The computer-implemented method of claim 1, further comprising:
selecting a layer of the output model for training the at least one hidden layer of the sample model;
generating, during configuring the at least one hidden layer of the sample model in accordance with the second task using the layer of the output model, output feedback data; and
training the at least one hidden layer of the sample model with the output feedback data.

4. The computer-implemented method of claim 1, further comprising, during the training, removing one or more nodes to create the hidden layer,
wherein configuring the at least one hidden layer of the sample model in accordance with the second task comprises configuring unremoved nodes in the hidden layer.

5. A computer-implemented method comprising:
receiving text data;
receiving text metadata corresponding to the text data; and
generating, using the text data, the text metadata, and a speech model, first audio output data corresponding to the text data,
wherein the speech model includes:
a hidden layer having values determined at least in part by:
a first task using a first section of a model, and
a second task using a second section of the model, wherein the second task includes maximizing a metric of perceived quality of the first audio output data,
the first section of the model, and
wherein the speech model does not include the second section of the model.

6. The computer-implemented method of claim 5, wherein the first section of the model corresponds to a first section of a conditioning model, and wherein the second section of the model corresponds to a second section of the conditioning model.

7. The computer-implemented method of claim 5, wherein the first section of the model corresponds to a first section of an output model, and
wherein the second section of the model corresponds to a second section of the output model.

8. The computer-implemented method of claim 5, wherein the first task comprises measuring an accuracy of the speech model, and further comprising comparing the first audio output data to corresponding audio training data.

9. The computer-implemented method of claim 5, further comprising:
training, using a section of a second model, the at least one hidden layer of the speech model in accordance with the second task.

10. The computer-implemented method of claim 5, wherein maximizing the metric of perceived quality comprises at least one of:
computing, using the first audio output data, a perceptual evaluation of speech quality (PESQ) standard; and
computing, using the first audio output data, a mel-frequency cepstrum (MFC).

11. The computer-implemented method of claim 5, further comprising, during maximizing the metric of perceived quality of the first audio output data, reducing a number of nodes of the hidden layer.

12. The computer-implemented method of claim 11, further comprising determining a second speech model using an output of the hidden layer.

13. A system comprising:
at least one processor; and
at least one memory including instructions that, when executed by the at least one processor, cause the system to:
receive text data;
receive text metadata corresponding to the text data; and
generate, using the text data, the text metadata, and a speech model, first audio output data corresponding to the text data,
wherein the speech model includes:
a hidden layer having values determined at least in part by:
a first task, using a first section of a model, and
a second task, using a second section of the model, wherein the second task includes maximizing a metric of perceived quality of the first audio output data,
the first section of the model, and
wherein the speech model does not include the second section of the model.

14. The system of claim 13,
wherein the first section of the model corresponds to a first section of a conditioning model, and
wherein the second section of the model corresponds to a second section of the conditioning model.

15. The system of claim 13,
wherein the first section of the model corresponds to a first section of an output model,
and wherein the second section of the model corresponds to a second section of the output model.

16. The system of claim 13, wherein the first task comprises measuring an accuracy of the speech model, and wherein the memory further comprises instructions that, when executed by the at least one processor, further cause the system to compare the first audio output data to corresponding audio training data.

17. The system of claim 13, wherein the memory further comprises instructions that, when executed by the at least one processor, further cause the system to train, using a section of a second model, the at least one hidden layer of the speech model in accordance with the second task.

18. The system of claim 13, wherein the instructions that cause the system to maximize the metric of perceived quality further cause the system to:
   compute, using the first audio output data, a perceptual evaluation of speech quality (PESQ) standard; or
   compute, using the first audio output data, a mel-frequency cepstrum (WC).

19. The system of claim 13, wherein the memory further comprises instructions that, when executed by the at least one processor, further cause the system to, during maximizing the metric of perceived quality of the first audio output data, reduce a number of nodes of the hidden layer.

20. The system of claim 13, wherein the memory further comprises instructions that, when executed by the at least one processor, further cause the system to determine a second speech model using an output of the hidden layer.

* * * * *